US009166786B2

(12) United States Patent
Napoli et al.

(10) Patent No.: US 9,166,786 B2
(45) Date of Patent: Oct. 20, 2015

(54) PERSONAL PORTABLE SECURED NETWORK ACCESS SYSTEM

(75) Inventors: John F. Napoli, Rancho Palos Verdes, CA (US); Edward F. Hooks, Jr., Castle Rock, CO (US)

(73) Assignee: AUTHENTICATION HOLDINGS LLC, Centennial, CO (US)

( * ) Notice: Subject to any disclaimer, the term of this patent is extended or adjusted under 35 U.S.C. 154(b) by 172 days.

(21) Appl. No.: 12/690,918

(22) Filed: Jan. 20, 2010

(65) Prior Publication Data

US 2010/0186078 A1      Jul. 22, 2010

Related U.S. Application Data

(60) Provisional application No. 61/145,904, filed on Jan. 20, 2009.

(51) Int. Cl.
*H04L 9/32*     (2006.01)
*H04L 9/08*     (2006.01)
*H04L 29/06*    (2006.01)

(52) U.S. Cl.
CPC ............ *H04L 9/0897* (2013.01); *H04L 9/3231* (2013.01); *H04L 9/3234* (2013.01); *H04L 63/0815* (2013.01); *H04L 63/0853* (2013.01); *H04L 63/0861* (2013.01); *H04L 2209/60* (2013.01)

(58) Field of Classification Search
CPC ... H04L 9/0897; H04L 9/3231; H04L 9/3234; H04L 63/0853; H04L 63/0861; H04L 63/0815
USPC .................. 713/155, 161, 168, 169, 170, 186; 709/203, 217, 223, 236, 225, 229; 380/42, 55, 58, 46; 726/2, 17, 26, 28, 726/29, 30
See application file for complete search history.

(56) References Cited

U.S. PATENT DOCUMENTS

| 2004/0075685 | A1* | 4/2004 | Ohyama et al. ............... 345/745 |
| 2007/0118609 | A1  | 5/2007 | Mullan et al. |
| 2007/0136604 | A1* | 6/2007 | Kuhlman et al. ............. 713/186 |
| 2007/0275754 | A1  | 11/2007 | Oshima et al. |

(Continued)

FOREIGN PATENT DOCUMENTS

| JP | 09-251331 | 9/1997 |
| JP | 2002-366522 | 12/2002 |

(Continued)

OTHER PUBLICATIONS

PCT International Search Report and Written Opinion for PCT/US2010/00140, mailed Mar. 2, 2010, 6 pages.

(Continued)

*Primary Examiner* — Brandon Hoffman
*Assistant Examiner* — Nega Woldemariam
(74) *Attorney, Agent, or Firm* — Nicholson De Vos Webster & Elliott LLP

(57) ABSTRACT

Authenticating a customer for access to a content server. The customer is biometrically authenticated to a secure terminal based on information stored in a secure personal storage device belonging to the customer. The customer is allowed access to the secure terminal after a successful authentication. The customer is authenticated to the content server based on account credentials stored on the secure personal storage device issued by the content server.

37 Claims, 14 Drawing Sheets

(56) References Cited

U.S. PATENT DOCUMENTS

2008/0282334 A1* 11/2008 Yves et al. .................. 726/9
2010/0287369 A1* 11/2010 Monden ..................... 713/156

FOREIGN PATENT DOCUMENTS

| JP | 2005-085080 | 3/2005 |
| JP | 2005-165966 | 6/2005 |
| JP | 2005-301500 | 10/2005 |
| JP | 2008-046679 | 2/2008 |
| JP | 2009-238064 | 10/2009 |

OTHER PUBLICATIONS

First Office Action for JP2012-549974 and English translation thereof, Apr. 10, 2014, 18 pages.
Examiner's First Report dated Apr. 12, 2014, for Australian Patent Application No. 2010207022, 2 pages.
First Office Action for KR10-2012-7021562, Aug. 29, 2014, 8 pages.

* cited by examiner

PERSONAL PORTABLE SECURED NETWORK ACCESS SYSTEM

CROSS-REFERENCE TO RELATED APPLICATIONS

This application claims the benefit of U.S. Provisional Application No. 61/145,904, filed Jan. 20, 2009, which is hereby incorporated by reference.

BACKGROUND

1. Field

Embodiments of the invention relate to the field of data processing; and more specifically to a personal portable secured network access system.

2. Background

It is common for computing devices (e.g., laptop, workstation, mobile phone, smartphone, etc.) to access resources over a network such as the Internet. A common mechanism for securing resources is through a username/password authentication system or other unique identifier which must be entered by the user. It is not uncommon for a user to have to manage dozens of username and password combinations for different accounts on the Internet. As a result, users typically create fairly unsecure passwords or use the same username and password for multiple accounts. These username and password authentication systems do not actually prove the identity of the user—that is, an imposter may be able to access the account once the username and password are compromised.

In addition, current network systems are unable to verifiably set age driven content because there is currently no secure methods to verify that a user over the Internet is a certain age. Age verification systems that depend on credit cards are not secure if the credit card numbers are not secure.

In addition, while mobile computing devices such as laptops, mobile phones, smartphones, etc. offer a convenient and mobile computing environment, they can easily be misplaced or stolen and the data stored on the device vulnerable. Cryptographic systems exist to protect the data but these are often not used because of their complexity. In either case, unless the data is backed up, the data will be lost.

There are two common forms of delivering media. The first includes a pervasive digital rights management which ties media content to a particular computing device type and severely restricts copying or moving the media file from one computing device to another. The second form is the opposite—having no digital rights management such that the media content can easily be passed between people without compensation to the media content owner.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
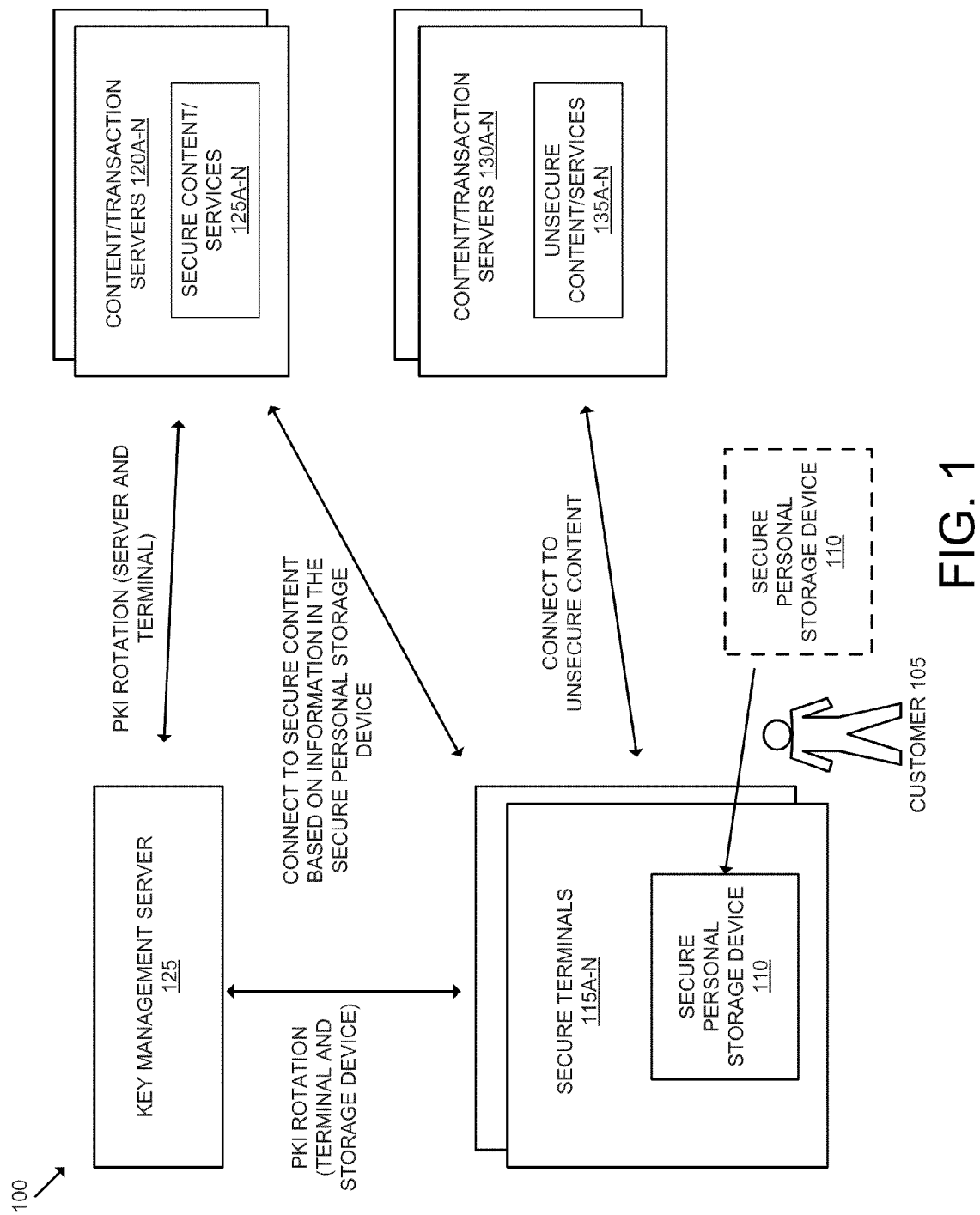
FIG. 1 illustrates an exemplary personal portable secured network access system according to one embodiment of the invention.

FIG. 1 is an exemplary personal portable secured network access system according to one embodiment of the invention. The system 100 includes the secure terminals 115A-115N, the content and/or transaction servers (hereinafter content servers) 120A-120N and 130A-130N, the customer 105, the secure personal storage device 110, and the key management server 125. The secure terminals 115A-115N are adapted to activate only when a secure personal storage device is inserted. That is, the secure terminal cannot operate without a secure personal storage device being inserted or attached. The secure terminals 115A-115N do not store any customer related data (e.g., data files, account credentials, customer settings or preferences, biometric samples, etc.). When a secure personal storage device is removed from a secure terminal, that secure terminal clears its memory thereby removing any memory footprint from the secure terminal that indicates use by a customer.

The customer 105 initiates a secure computing session with any of the secure terminals 115A-115N by inserting the secure personal storage device 110 into that secure terminal The secure personal storage device 110 (e.g., an SD card, a flashdrive, a thumbdrive, an optical disk, etc.), which is owned/used by the customer 105, stores data specific to the customer 105 (e.g., user data files, account credentials, settings/preferences, etc.). After the secure personal storage device 110 is inserted or attached into one of the secure terminals 115A-115N, that secure terminal will power on and boot and launch an authentication application to verify that the person who inserted or attached the secure personal storage device 110 belongs to that secure personal storage device. This authentication will include biometric validation (e.g., voiceprint validation, fingerprint analysis, retinal scan, handwriting analysis, or any combination of voiceprint validation, fingerprint analysis, retinal scan, and handwriting analysis, etc.) or similar confidence, non-text based authorization. After being authenticated, the customer 105 may use that secure terminal to use local applications (e.g., media players, office suite applications, email applications, games, etc.), access services and/or content across a network (e.g., LAN, WAN (e.g., the Internet), WLAN, etc.).

Some content and/or service providers will be able to provide secure access to and non repudiation in delivery of their content and/or services. The secure access is available only to authenticated customers through the secure terminals 115A-115N. For example, the secure terminals 115A-115N include a customized secure terminal web browser which is used to access the content servers 120A-120N and the content servers 130A-130N. The content servers 120A-120N include the secure content and/or services 125A-125N while the content servers 130A-130N include the unsecure content and/or services 135A-135N. Each one of the secure terminals 115A-115N and the content servers 120A-120N are adapted to allow access to the secure content and/or services 125A-125N based on secure terminal validation of the customer presenting the secure personal storage device 110, and the authentication of account credentials issued by the secure content and/or services 125A-125N to the secure personal storage device id 280 in the secure personal storage device 110. For example, the content servers 120A-120N are adapted to recognize connections from the customized secure terminal web browser (as compared to other types of web browsers from different types of computing devices) and thus identifying that a secure terminal (e.g., one of the secure terminals 115A-115N) is being used. The content servers 120A-120N trust that the customer using that secure terminal is authentic (i.e., is the person belonging to the secure personal storage device 110) and that the information on the secure personal storage device 110 (e.g., account credentials) can be trusted. Customer re-verification at any point in the computing session is also supported. If there are account credentials on the secure personal storage device 110 for the selected one of the secure content and/or services 125A-125N, the corresponding server can use those credentials to authenticate the customer and allow access to the content and/or service without the customer having to enter in a username/password, PIN, or other identifying information. If account credentials are not on the secure personal storage device 110, the server can create and associate account credentials with the secure personal storage device 110 for the selected content and/or service, which can then be written to the secure personal storage device 110 by the electronics of the secure terminal 115A. The next time that a secure terminal with that secure personal storage device 110 accesses the server for that secure content and/or service, the account credentials in the storage device 110 are used to authenticate and automatically direct the customer to the content and/or service.

The secure terminals 115A-115N and the content servers 120A-120N are coupled with the key management server 125. The key management server 125 manages a PKI (Public Key Infrastructure) rotation between the secure terminals 115A-115N and secure personal storage devices (e.g., the secure personal storage device 110), and manages a PKI rotation between the secure terminals 115A-115N and the content servers 120A-120N.

PKI keyed access to the secure personal storage device 110 creates the opportunity to support public and private secure terminals 115A-115N. Some of the secure terminals 115A-115N are private enterprise secure terminals. Private enterprise secure terminals 115A-115N can be limiting in association of secure personal storage devices (such as the secure personal storage device 110), to one or a group of secure terminals 115A-115N, while public secure terminals allow any secure personal storage device created on the public network. In some embodiments a secure personal storage device 110 can only be used on a particular one of the secure terminals 115A-115N or on a group of two or more of the secure terminals 115A-115N, while in other embodiments the secure personal storage device 110 can be used on any of the secure terminals 115A-115N.

In one embodiment, the content/transaction server 120A displays targeted advertising based on the customer's identity. For example, since the personal portable secured network access system 100 authenticates the customer 105 as using the network resource, as opposed to a computing device (which many different customers may use over a given time period), advertising can be targeted specifically based on the actions of the customer 105 while using the secure personal storage device 110. To illustrate, the content server 120A may store one or more cookies for the secure personal storage device identifier 280. The selection of the advertisements for the customer 105 can be customized to the demographic/market data derived from examining the cookies associated with the secure personal storage device identifier 280. It should be understood that the cookies do not reveal the identity of the of the customer 105.

Figure 2:
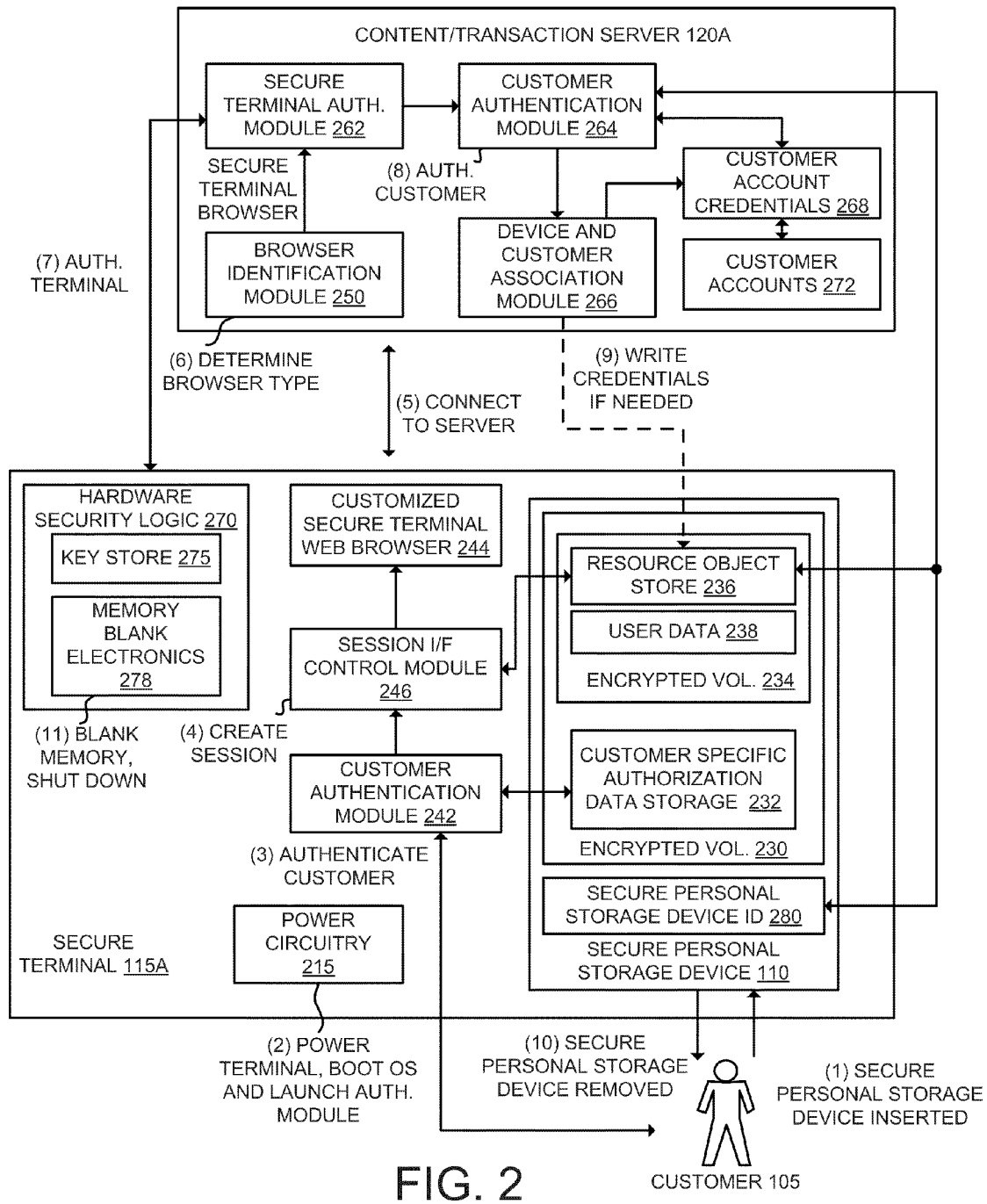
FIG. 2 illustrates a more detailed view of the interaction between a secure personal storage device, a secure terminal, and a content server according to one embodiment of the invention.

FIG. 2 illustrates a more detailed view of the interaction between a secure personal storage device, a secure terminal, and a content server according to one embodiment of the invention. The customer 105 initiates a secure computing session with the secure terminal 115A by inserting the secure personal storage device 110 into the terminal at operation 1. Prior to the secure personal storage device 110 being inserted, the secure terminal 115A is not capable of being powered on. Insertion of the secure personal storage device 110 completes operating power circuitry of the secure terminal 115A allowing the secure terminal 115A to power on to customer use. In one embodiment, insertion of the secure personal storage device 110 automatically causes the secure terminal 115A to fully power on (or alternatively resume from hibernation), while in other embodiments insertion allows the secure terminal 115A to be powered on by the customer 105 (e.g., the customer 105 will press a power button to return the secure terminal to a usable state from hibernation). Thus at operation 2, the power circuitry 215 is completed and power is applied to the secure terminal 115A. In addition, the secure terminal 115A boots its operating system and launches the customer authentication module 242.

Unique identifying data stored on the secure personal storage device 110 will be used during authentication of the customer 105 to the secure terminal 115A. After being authenticated, a secure computing session will be established between the customer 105 and the secure terminal 115A allowing the customer 105 to use the applications of the secure terminal 115A (e.g., including the customized secure terminal web browser 244). While the customer 105 may use the applications of the secure terminal 115A, it should be understood that the secure terminal 115A does not store and retain any data associated with the customer 105A (neither user files or user computer activity); however rights-protected and local application data may be stored on the secure personal storage device 110. Secure terminal 115A can permit approved external programs to be launched from, or data saves to, separate removable device bus channels within session security constraints. When the secure computing session ends and/or the secure personal storage device 110 is removed from the secure terminal 115A, the secure terminal 115A permanently erases its temporary memory, thereby removing any memory footprint from the secure terminal 115A that indicates use by the customer 105.

The secure personal storage device 110 (e.g., an SD card, a flashdrive, a thumbdrive, an optical disk, etc.), which is owned/used by the customer 105, stores data specific to the customer (e.g., user generated data files, account credentials for one or more network accounts, etc.) that may be used and/or generated during a secure computing session with the secure terminal 115A and the content server 120A. For example, as illustrated in FIG. 1, the secure personal storage device 110 includes the customer specific authentication data storage 232, the resource object store 236 (which includes account credentials, computing session requirements, resource requirements, encryption key(s), etc.), and the user data 238. The customer specific authentication data storage 232 stores unique information of the customer 105 that is gathered during registration and used by the secure terminal 115A during customer authentication. In one embodiment, a certified registration may be employed to validate supplied customer attributes to support age or location constrained transactions or content access. For instance, the customer specific authentication data includes one or more of biometric data (e.g., one or more of voiceprint validation samples, fingerprint samples, retinal scan images, handwriting samples, etc.) and if registration is certified other attributes such as data of birth of the customer 105. In some embodiments, the customer specific authentication data storage 232 does not include personal information including the customer's name, address, social security number, phone number, email address, etc. As will be described in greater detail later herein, in one embodiment the secure terminal 115A includes the capability of allowing the customer 105 to train biometric data (provide biometric samples) for authentication. The customer 105 may also train the biometric data at an authorized location (e.g., when registering and/or purchasing the secure personal storage device 110).

The resource object store 236 includes support for resource object packages for different resource owners or multiple resources from the same owner. As used herein, a resource owner is a content and/or service provider that provides resources (content and/or services) to customers. Typically the resource owners provide secure resources. Each resource object package may include account credentials (e.g., one or more usernames and passwords or other authentication key(s)) for the secure resources being provided (e.g., credentials for an account of the customer 105). The resource object package may also include computing session requirements. For example, some resources may need certain secure terminal settings to be configured before they are allowed to be accessed (e.g., VPN (Virtual Private Network) settings, proxy settings, firewall settings, age specific verification, etc.). In one embodiment, the content of the resource object store 236 is not known to the customer 105 nor able to be read by the customer 105. In some embodiments, the content of the resource object store 236 (e.g., account credentials, computing session requirements, resource requirements, encryption key(s), etc.) are created by content servers (e.g., the content server 120). For instance, content provider A may generate a specific username and password (or other authenticating identifier) for the customer 105 and content provider B may generate a different specific username and password for the customer 105. As will be described in greater detail later herein, the account credentials are used by content servers when authenticating the customer 105, and may be used in place of the standard username/password and/or personal identification number query typically used by the content servers to create a zero-click account access experience that is also exempt from social engineering theft risk.

In some embodiments, for example those involving third party certified registration, the customer specific authentication data storage 232 also includes the date of birth of the customer 105 which can be used to restrict the services that are available to the customer 105. In one embodiment, secure personal storage devices trained through self-registration cannot include customer attributes beyond the authentication data (e.g., the biometric authentication data). For example, content and/or service providers can restrict the availability of their content and/or services based on age. For instance, some content and/or services can be restricted to customers over a certain age, below a certain age (e.g., chat rooms directed towards minors), within a certain age group, etc. In some embodiments, date of birth of the customer 105 will not be stored unless and until the customer 105 verifies his/her age. For example, the customer 105 may be required to show proof of age by displaying a government issued ID when purchasing the secure personal storage device 110 or when registering, under supervision, the secure personal storage device 110 at an authorized location.

The user data 238 includes any data generated and saved during a secure computing session (e.g., rights-managed content files, application settings (e.g., browser bookmarks), secure terminal settings (e.g., font size, etc.), etc.). In some embodiments, the secure terminal 115 includes ports or slots for removable media for the customer 105 to use for storing user data files in addition to the secure personal storage device 110.

The information stored on the secure personal storage device 110 used or generated during the secure computing session with the secure terminal 115A may be encrypted (e.g., by the secure terminal 115). In one embodiment the secure terminal 115A requires a biometrically seeded human key to decrypt encrypted volume 234. For example, the customer specific authentication data storage 232 is contained within the encrypted volume 230 and the resource object store 236 and the user data 238 are contained within the encrypted volume 234. The encrypted volume 234 is contained within the encrypted volume 230. The encrypted volumes are encrypted with the intention that they can only be decrypted by an appropriate secure terminal (e.g., the secure terminal 115). In some embodiments, the data in the customer specific authentication data storage 232 is used to decrypt the encrypted volume 234. For example, prior to the secure terminal 115 and/or the customer 105 having access to the user data 238 or the resource object store 236, the customer 105 must be successfully authenticated to the secure terminal 215. It should be understood that the encryption scheme illustrated in FIG. 1 is exemplary, and other encryption schemes may be used in embodiments (e.g., a single encrypted volume, non-nested encrypted volumes, etc).

The secure personal storage device 110 also includes the secure personal storage device identifier 180. In one embodiment, the secure personal storage device identifier 180 is a non-modifiable unique hardware identifier implanted during manufacture of the secure personal storage device 110. Thus each different secure personal storage device has a different and unique storage device identifier.

The secure terminal 115A includes the authentication module 242 to authenticate the identity of customers corresponding to the information stored on the secure personal storage device 110. Thus at operation 3, the authentication module 242 performs an authentication procedure based on the information in the customer specific authentication data storage 232 in the secure personal storage device 110 and data input by the customer 105 (e.g., biometric input such as a voiceprint sample). A detailed biometric authentication mechanism will be described in greater detail later herein. If the authentication procedure is not successful, the customer 105 will not be allowed to use the secure terminal 115A. However, if the authentication procedure is successful, then a secure computing session may be started.

Thus at operation 4, the session interface control module 246 creates a secure computing session. After creating the session, the customer 105 is able to access and use resources (e.g., local resources such as local applications, network resources (unsecure resources and/or secure resources), etc.). A session inactivity lock-out timer is begun with session creation, and support for session re-verification timers are included with the frequency established by resource owners. As described above, some resources may require certain terminal settings to be configured before they are allowed to be accessed. Thus the session interface control module 246 accesses the resource object store 236 of the secure personal storage device 110 to determine and apply any applicable resource requirements. This is described in greater detail later herein.

If the selected resource is a network resource (e.g., a website), the customized secure terminal web browser 244 is used to connect to that resource. The customized secure terminal web browser 244 is a web browser capable of accessing secure network resources and unsecure network resources. Secure network resources are those which have been customized for the personal portable secured network access system 100 and are trusted. For example, some websites may include a secure section that is specifically tailored for secure terminals, such as the secure terminal 115A. Computing devices that are not secure terminals may not be able to access that secure section. Unsecure network resources are those that are not trusted (e.g., regular Internet websites which have not been customized for the personal portable secured network access system 100). By way of example, the content server 120A allows secure access using the system 100 to network resources. Thus at operation 5, the terminal 115A connects to the content server 120A through the customized secure terminal web browser 244.

The content server 120A includes the browser identification module 250 to determine the type of web browser for incoming connection requests; those that belong to a secure terminal browser such as the browser 244 are directed to the secure terminal authentication module 150 while other web browsers (from computing devices that are not secure terminals) are redirected to an unsecure section of the content server 120 (which is not illustrated). Thus at operation 6, the browser identification module 250 determines that the browser type for the incoming connection request is the customized secure terminal web browser 244.

The secure terminal authentication module 262 authenticates secure terminals based on one or more encryption keys. For example, the secure terminal 115A and the content server 120A exchange encryption keys, and the secure terminal 115 transmits an encryption key specific when requesting access to the content server 120A. The hardware security logic 270 of the secure terminal 115A includes the key store 275 which stores encryption key(s) between content servers and/or secure personal storage devices. If the secure terminal 115A cannot be authenticated, then the content server 120A will deny it access (at least to the secure section of the content server 120A). Thus at operation 7, the secure terminal authentication module 262 performs an authentication procedure for the secure terminal 115A. For purposes of explanation, the secure terminal 115A passes the authentication procedure.

Sometime after authenticating the secure terminal 115A, at operation 8 the customer authentication module 264 determines whether the customer 105 (as identified through the secure personal storage device identifier 280) is authorized to use the services and/or access the requested content depending on whether account credentials on the secure personal storage device 110 (stored in the resource object store 236) match account credentials in the customer account credential store 268 for the secure personal storage device identifier 280. If the account credentials match, the browser 244 is directed to that content and/or service, typically without further interaction from the user. Of course it should be understood that the content server 120A may at any point require a biometric authentication to verify the identity of the customer 105 (e.g., prior to completing a financial transaction, etc.).

If there are no account credentials in the customer account credential store 268 (e.g., this is the first time the customer 105 has attempted to access the content server 120A using a secure terminal), the customer authentication module 264 may cause a series of questions to be displayed for the customer 105 to verify his/her identity and to create an account if the customer 105 is not registered. After the customer 105 has verified his/her identity, the device and customer association module 266 creates and associates account credentials with the secure personal storage device identifier 280. The created account credentials may then be written to the resource object store 236. Thus at operation 9, account credentials are written to the resource object store 236.

The secure computing session is terminated when the customer 105 removes the secure personal storage device 110 from the secure terminal 115A. The secure computing session may also end in other ways, which will be described in greater detail later herein. At operation 10, the customer 105 removes the secure personal storage device 110 from the secure terminal 115A. The hardware security logic 270 ensures that the temporary memory of the secure terminal 115A is permanently erased when the secure personal storage device 110 is removed. The security logic 270 includes the memory blank electronics 278 for permanently erasing the temporary memory of the secure terminal 115 when the secure personal storage device 110 is removed from the secure terminal 115. For example, the memory blank electronics 278 sets all values to zero. In addition, in some embodiments the hardware security logic 170 contains tamper-proof electronics such that if the device is tampered with (e.g., the case of the secure terminal 115 is physically opened without authorization, etc.), the temporary memory blank electronics 278 erases the memory of the secure terminal 115A and any keys in the key store 275.

Figure 3:
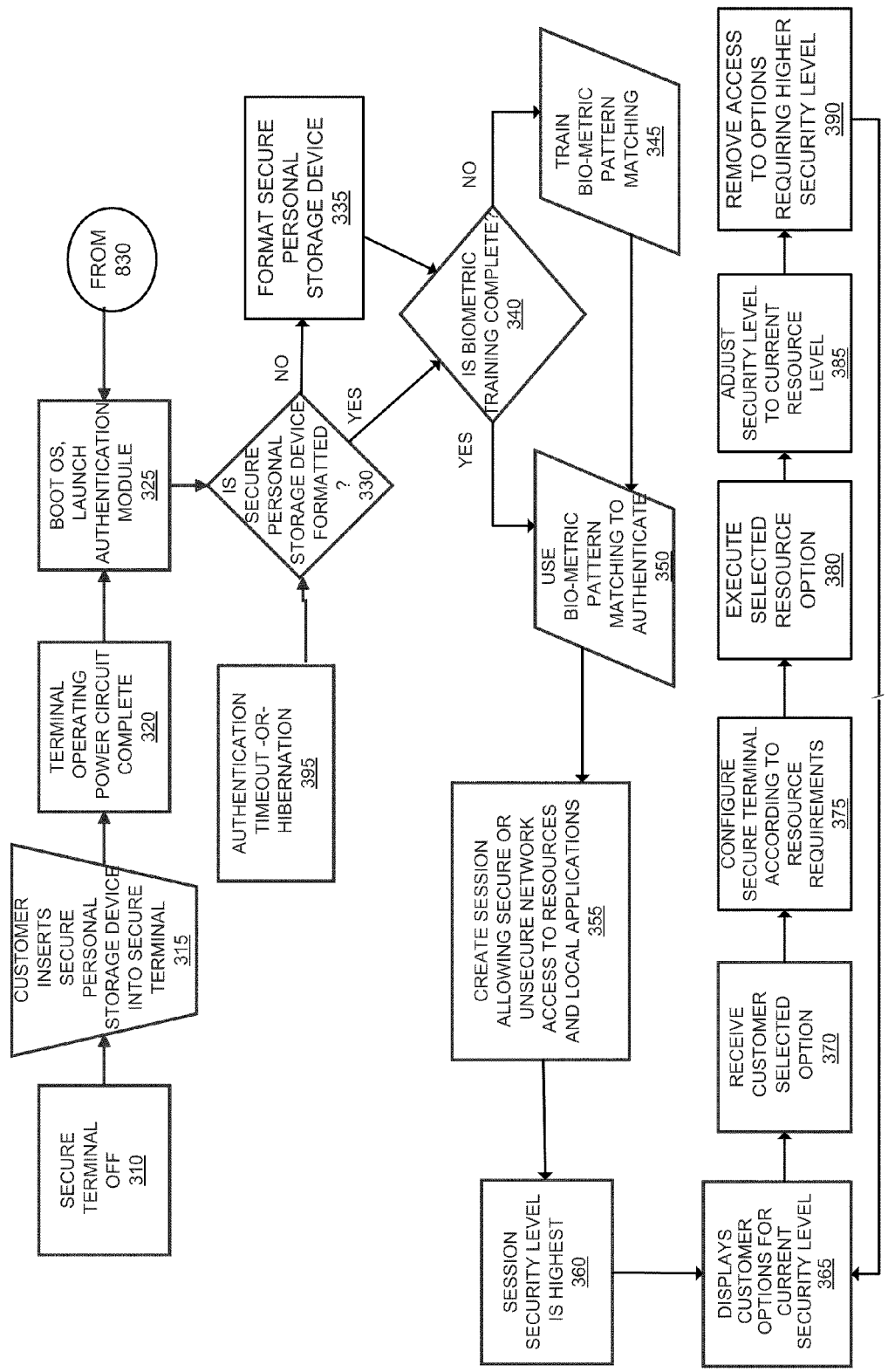
FIG. 3 is a exemplary personal portable secured network access system 100 according to one embodiment of the invention.

FIG. 3 is a exemplary personal portable secured network access system 100 according to one embodiment of the invention. The operations of the FIG. 3 will be described with reference to the exemplary embodiment of FIG. 2. However, it should be understood that the operations of FIG. 3 can be performed by embodiments of the invention other than those discussed with reference to FIG. 2, and the embodiments discussed with reference to FIG. 2 can perform operations different than those discussed with reference to FIG. 3.

At block 310, the secure terminal 115A is powered down (or alternatively in a hibernation state). It should be understood that in this state, no customer data or customer settings are stored on the secure terminal 115. Flow moves from block 310 to block 315, where the customer 105 inserts the secure personal storage device 110 into the secure terminal 115A. Insertion of the secure personal storage device 110 completes operating power circuitry of the secure terminal allowing the secure terminal 115A to power on, as indicated in block 320. Control flows from block 320 to block 325.

At block 325, the secure terminal 115A begins an initialization procedure including booting its operating system and launching the customer authentication module 242. For example, firmware on the secure terminal 115A is activated upon the secure personal storage device 110 being inserted causing the operating system to boot and the authentication module 242 to launch. It should be understood that the customer 105 cannot use the secure terminal 115 without being authenticated. Control flows from block 325 to block 330.

At block 330, the authentication module 242 determines whether the secure personal storage device 110 is properly formatted for use in the secure terminal 115A (e.g., whether the encrypted volumes 230 and 234 and their contents have been created on the secure personal storage device 110). In some embodiments the secure terminal 115A accepts blank storage devices (e.g., storage devices purchased off the shelf that are not specifically identified as a secure personal storage) and formats them to allow use in the secure terminal 115A. In some embodiments customers can purchase pre-formatted secure personal storage devices. If the secure personal storage device 110 is formatted correctly then flow moves to block 340, otherwise flow moves to block 335 where the device is formatted for use in the secure terminal 115 (e.g., the encrypted volumes 230 and 234 are created, etc.). Flow moves from block 335 to block 340.

At block 340, the authentication module 242 next determines whether biometric training has been completed on the secure personal storage device 110. For example, the authentication module 242 may access the customer specific authentication data storage 132 of the secure personal storage device 110 to determine if a sufficient number of biometric samples are stored in order to authenticate the customer 105. In some embodiments the secure personal storage device 110 can include multiple different biometric sample types that are accepted by the secure terminal 115. For example, if using the secure terminal 115 in a library, a non-verbal biometric authentication may be appropriate instead of a verbal one. In some embodiments, the customer 105 may select between biometric authentication mechanisms. If biometric training is not completed (at least for the selected biometric authentication mechanism), then flow moves to block 345 where the authentication module 242 initiates a biometric authentication training application; otherwise flow moves to block 350 where the authentication module 142 begins one or more biometric challenges.

Figure 4:
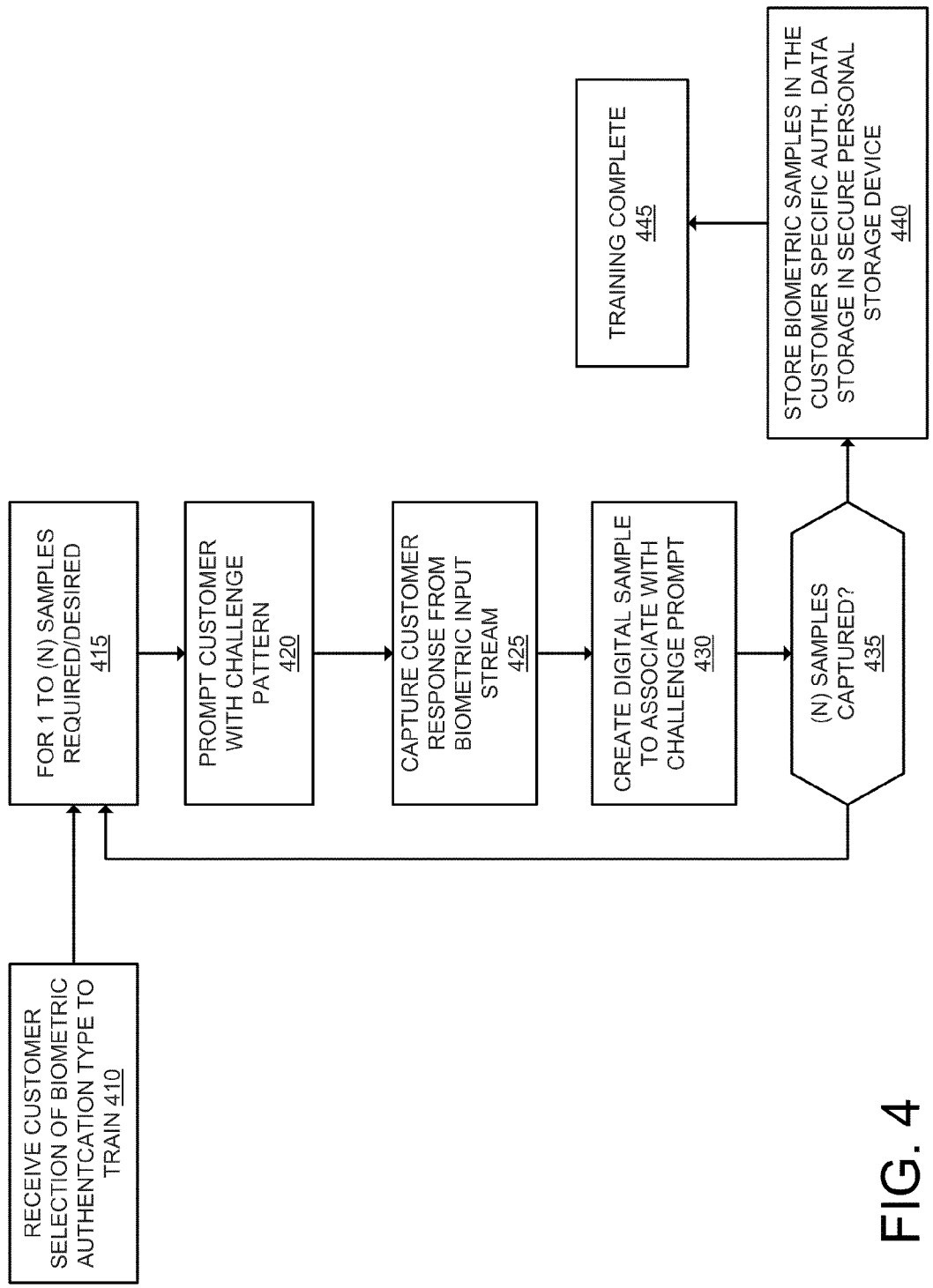
FIG. 4 is a flow diagram illustrating exemplary operations for a biometric training mechanism according to one embodiment.

FIG. 4 is a flow diagram illustrating exemplary operations for a biometric training mechanism according to one embodiment. The operations of FIG. 4 will be described with reference to the authentication module 242; however it should be understood that the operations of FIG. 4 can be performed by different module(s) and/or logic of the secure terminal 115A.

At block 410, the authentication module 242 receives a selection from the customer 105 of a biometric authentication type to train (e.g., voice, retinal scan, handwriting analysis, fingerprint analysis, etc.), and flow moves to block 415. Of course it should be understood that in some embodiments the customer 105 is not given an option to select a type of biometric authentication to train. That is, in some embodiments the secure terminal 115A requires training for one or more biometric authentication types. In such embodiments, the operation of block 410 is not performed.

The secure terminal 115A may require a different number of biometric samples for different biometric authentication types. At block 415, where a loop begins for the number of biometric samples required (or more if desired by the customer 105). Flow then moves to block 420, where the customer 105 is prompted with a challenge pattern. By way of example, the challenge may ask the customer 105 to read a passage from a book, write a number of characters or words, provide one or more fingerprints, etc. The challenge pattern can be prompted visually (e.g., on the display of the secure terminal 115A) and/or audibly (e.g., through the speakers of the secure terminal 115A). Control flows from block 420 to block 425.

At block 425, the authentication module 242 reads the biometric response from the customer 105 from a biometric input stream. Flow then moves to block 430, where the authentication module 242 creates a digital sample based on the response to associate with the challenge prompt. Next, flow moves to block 435 where the operations 420-430 will repeat until the required (or more if desired) number of challenge samples are completed. When the number of challenge samples are completed, then flow moves to block 440 where the authentication module 242 creates and stores the biometric samples in the customer specific authorization data storage 232 of the secure personal storage device 110. Flow moves from block 440 to block 445 and biometric training is complete.

It should be understood that the secure terminal 115A may require the customer 105 to pass multiple different types of biometric authentication prior to allowing access. In such a case, the customer may have to complete the training for multiple biometric authentication types.

In one embodiment, substantially soon after the biometric samples are stored in the customer specific authorization data storage 232 of the secure personal storage device 110, the secure terminal 115A clears its temporary memory (e.g., the memory blank electronics 278 of the hardware security logic 170 clears the volatile memory of the secure terminal 115A).

In any case, the biometric samples of the customer 105 will not be permanently stored on the secure terminal 115A.

Figure 5:
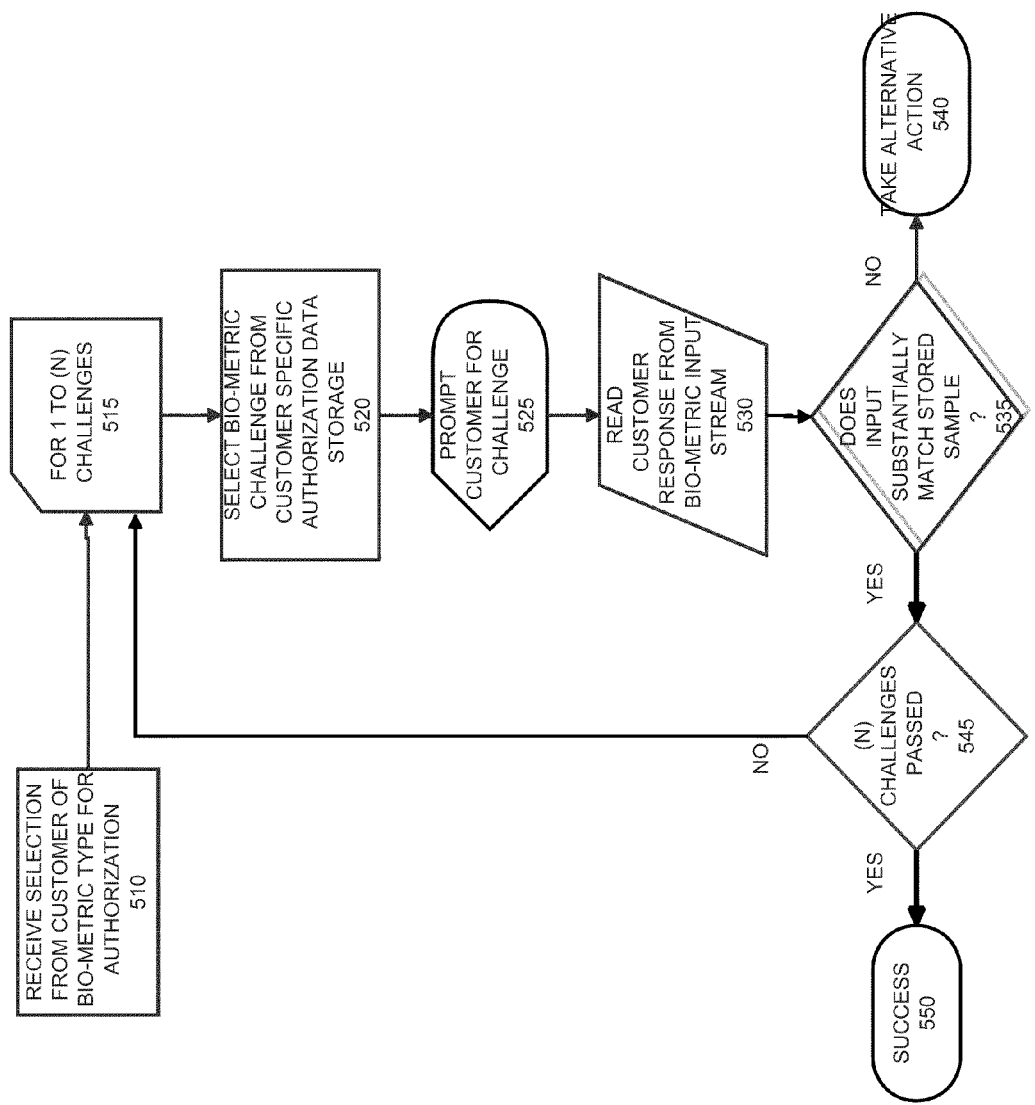
FIG. 5 is a flow diagram illustrating exemplary operations for a biometric authentication mechanism according to one embodiment.

Referring back to FIG. 3, at block 350 the authentication module 242 initiates a biometric authentication mechanism to perform an authentication on the customer 105. FIG. 5 is a flow diagram illustrating exemplary operations for a biometric authentication mechanism according to one embodiment. The operations of FIG. 5 will be described with reference to the authentication module 242; however it should be understood that the operations of FIG. 5 can be performed by different module(s) and/or logic of the secure terminal 115A.

At block 510, the authentication module 242 receives a selection from the customer 105 of a biometric authentication type to use for authentication, and flow moves to block 515. Of course it should be understood that in some embodiments the customer 105 is not given an option to select a type of biometric authentication to use for authentication purposes. That is, in some embodiments the secure terminal 115A requires one or more particular biometric authentication mechanisms to be successfully performed before allowing access. In such embodiments, the operation of block 510 is not performed.

As previously described, the secure terminal 115A may require that the customer 105 to pass a number of multiple biometric challenges (either for a single biometric authentication type or for multiple biometric authentication types) to be authenticated. As such, at block 515, a loop begins for the number of biometric challenges required for authentication. Flow then moves to block 520, where the authentication module 242 selects a biometric challenge (e.g., at random) of the selected or required biometric authentication type from the customer specific authorization data storage 232 of the secure personal storage device 110. Flow moves from block 520 to block 525, where the customer 105 is prompted with the selected biometric challenge. Similarly as described with reference to biometric training, the biometric challenge can be prompted visually (e.g., on the display of the secure terminal 115A) and/or audibly (e.g., through the speakers of the secure terminal 115A). Flow then moves to block 530.

At block 530, the authentication module 242 reads the biometric response from the customer 105 from a biometric input stream. Flow then moves to block 535, where the authentication module 242 determines whether the biometric response from the customer 105 substantially matches the stored biometric sample in the customer specific authorization data storage 232 of the secure personal storage device 110. If the biometric input substantially matches, the customer 105 passed the biometric challenge and flow moves to block 545, where the operations 520-535 are repeated until the customer 105 passes the required number of biometric challenges. If the customer 105 passes the required number of biometric challenges, then flow moves to block 550 and the customer 105 is authenticated to use the secure terminal 115A.

However, if the customer 105 failed the biometric challenge (the biometric input does not substantially match the stored biometric sample), then flow moves to block 540 where alternative action is taken. For example, a different biometric challenge may be prompted to the customer 105. However, in some embodiments, the customer 105 has a limited number of biometric challenges he/she can fail until the authentication module 242 determines that the customer 105 is not the owner/user of the secure personal storage device 110. In such a case, the secure terminal 115A can immediately power down and its memory erased.

Thus it should be apparent that only the customer that biometrically trained the secure personal storage device 110 will have access to that storage device and will be able to use the secure terminal 115A when the secure personal storage device 110 is inserted. Thus if the secure personal storage device 110 is lost or stolen, the data stored on the device will not be able to be read and cannot be used in any secure terminals.

Referring back to FIG. 3, after the customer 105 is authenticated, flow moves to block 355 where the secure terminal 115 creates a secure computing session allowing the customer 105 to access secure resources and unsecure resources. For example, the customer 105 may use secure terminal 115A to send or retrieve email, compose documents or other office related files, play music and/or video files, play games, etc. It should be noted that the secure terminal 115A cannot store any user data or other settings (e.g., application settings, preferences, etc.); this information is required to be stored on an external device (e.g., the content server in case of a network based application, the secure personal storage device 110, other removable storage device, etc).

The secure computing session may go through different security levels depending on what resources (e.g., secure, unsecure, etc.) the customer 105 has accessed. The different security levels also restrict what services/applications the customer 105 can currently use. For example, when the computing session is at the highest security level, the customer 105 can access secure resources (e.g., secure Internet websites) as well as unsecure resources. In contrast, when the computing session is at the lowest security level, the customer 105 cannot access secure resources (e.g., secure Internet websites) and may not be able to save any data generated during that computing session, until the computing session is restarted (which will be described in greater detail with reference to FIG. 8).

Initially, the secure computing session is set to the highest level of security, allowing the customer 105 to access secure and unsecure resources, which is represented by block 360. Flow then moves to block 365, where the secure terminal 115 displays several different resource options for the customer 105 based on the current security level. These resource options may include local applications, network applications, secure websites, unsecure websites, etc. These options may be displayed to the user through the customized terminal web browser 144 (or other application).

Figure 12A:
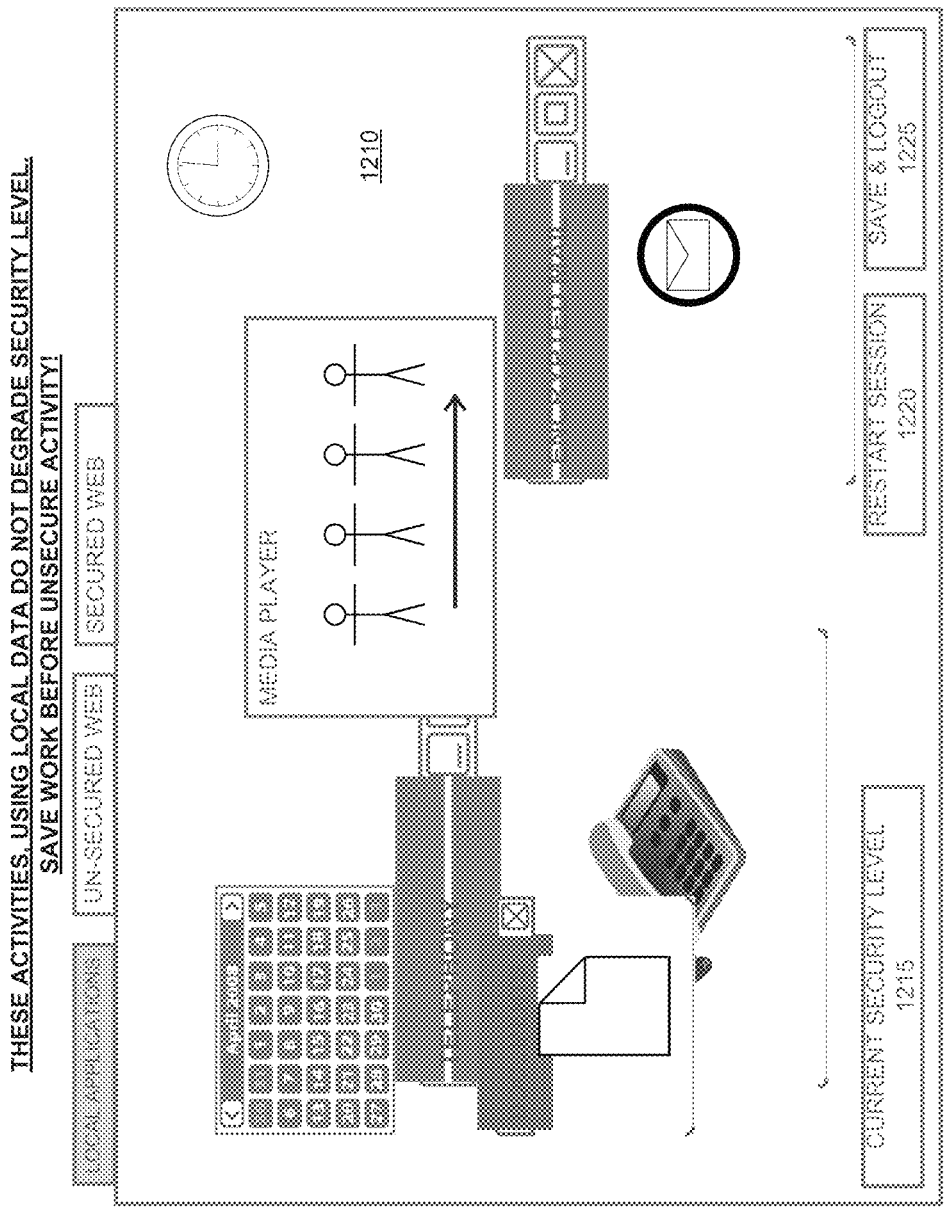
FIGS. 12A-12C illustrate an exemplary user interface for displaying resource options for the customer 105.
Figure 12B:
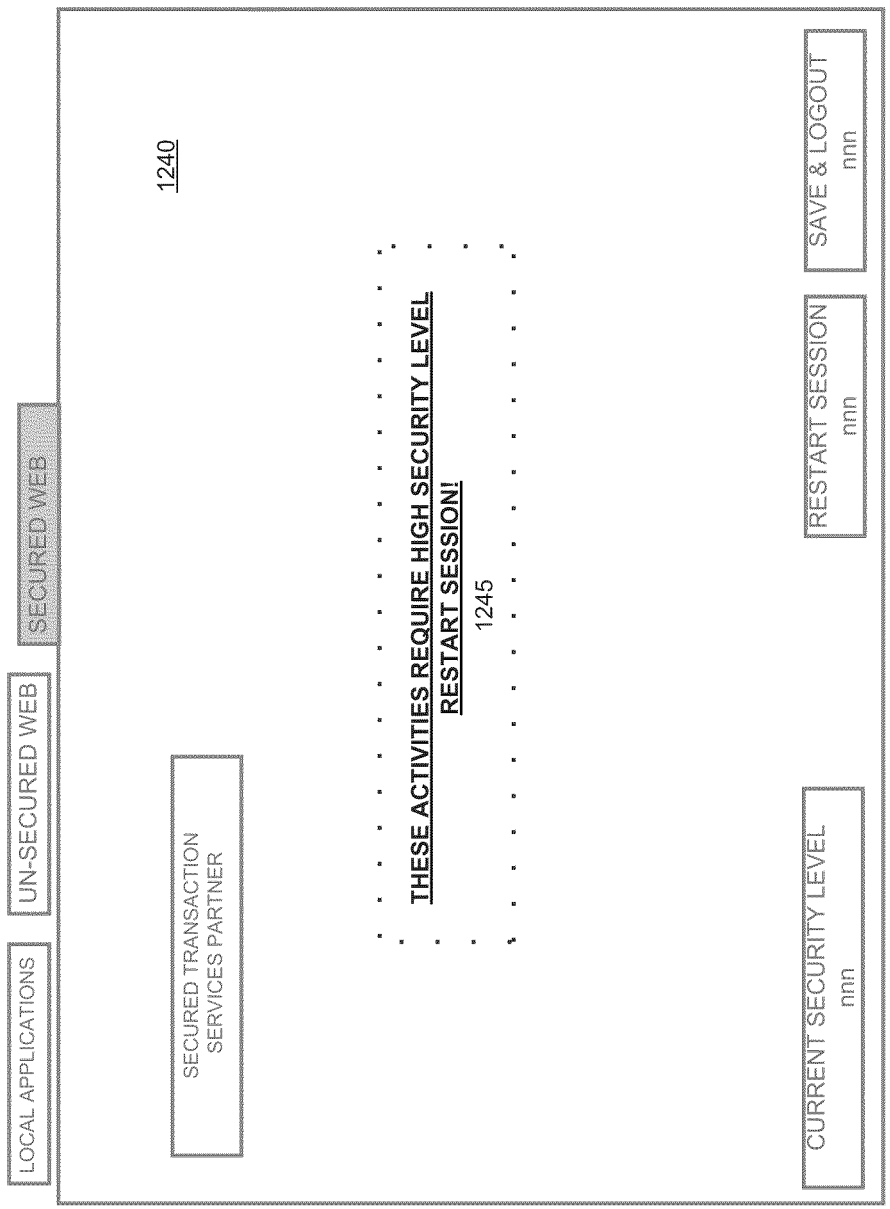
Figure 12C:
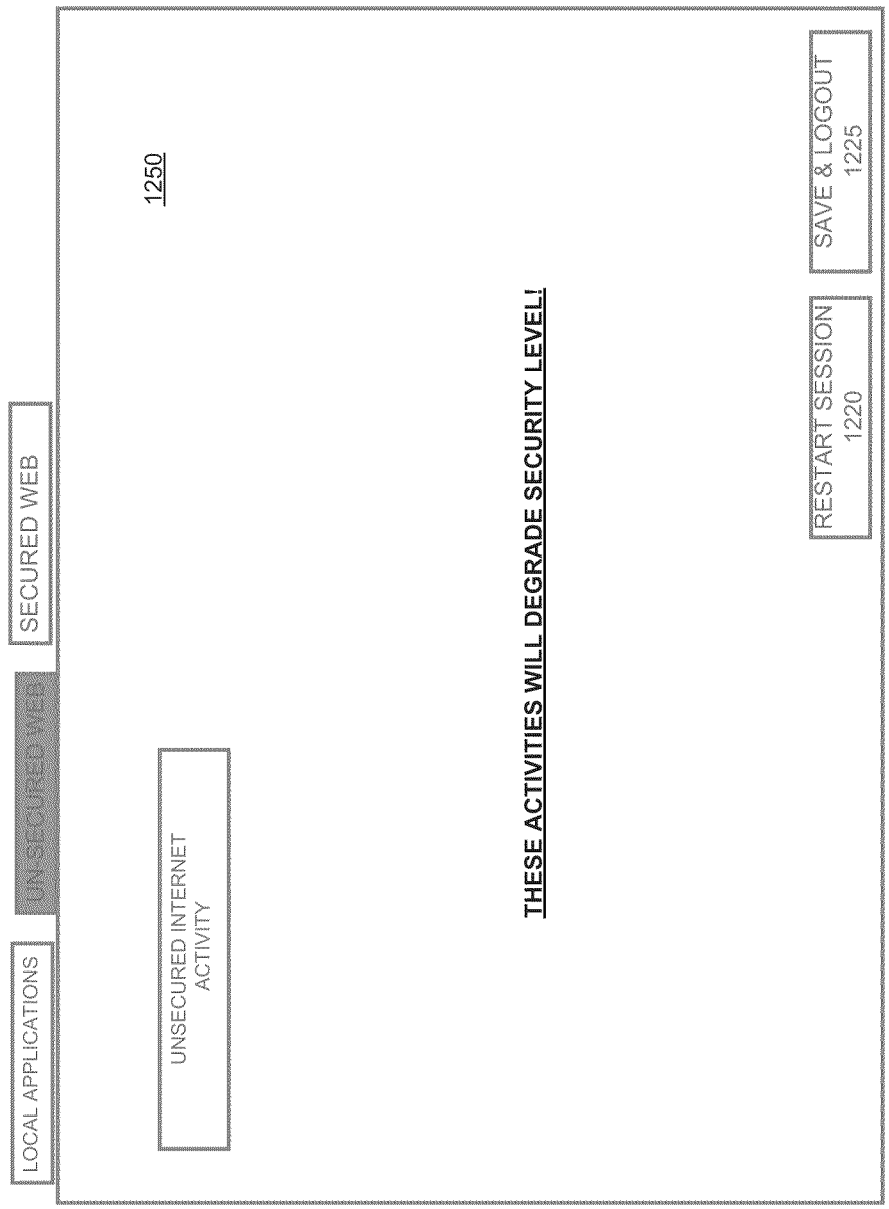

FIGS. 12A-12C illustrate an exemplary user interface for displaying resource options for the customer 105. Although FIGS. 12A-121C illustrate a tab metaphor, it should be understood that the resource options may be displayed or presented to the customer 105 differently in different embodiments. FIGS. 12A-12C each include the current security level field 1215, the restart computing session button 1220, and the save and logout button 1225. The current security level field 1215 indicates the current security level of the computing session. The restart computing session button 1220 allows the customer 105 to restart the computing session, which will be described in more detail with reference to FIG. 8. The save and logout button 1225 allows the customer 105 to save data generated during the computing session (e.g., to the secure personal storage device 110). As will be described in greater detail with respect to FIG. 6, the customer 105 may not be able to save data to the secure personal storage device 110 if the current security level is not adequate.

FIG. 12A illustrates the local applications tab 1210, which displays one or more local applications of the secure terminal. In one embodiment, each of the applications displayed on the local applications tab 1210 can be used regardless of the current security level of the computing session.

FIG. 12B illustrates the secure network resources tab 1240, which displays one or more secured network resources (e.g., secure Internet sites). In one embodiment, the secure network resources tab 1240 displays a set of one or more default secure network resources (e.g., secure network resources) which are not customized for the customer 105 (e.g., the customer 105 may not have an account with one or more of those secure network resources), while in other embodiments the tab 1240 displays a set of one or more secure network resources customized specifically for the customer 105 (e.g., those secure network resources in which the customer 105 has an account). For example, the names and/or URLs (uniform resource locators) of the secure network resources in which the customer 105 has an account with may be stored the resource object store 236. These names and/or links may be displayed in the secure network resources tab 1240.

As illustrated in FIG. 12B, the secure network resources tab 1240 includes the security notification window 1245. The security notification window 1245 may be displayed when the security level of the computing session is not at a level sufficient to access the displayed secure network resources. In one embodiment, in order to raise the security level, the computing session must be restarted. The security notification window 1245 alerts the customer 105 that the resources displayed require a high security level, and that the computing session must be restarted. The user can use the restart session button 1220 to restart the session and/or remove the secure personal storage device 110 and begin the authentication process (e.g., begin at block 315 of FIG. 3) to restart the session.

FIG. 12C illustrates the unsecure network resources tab 1250, which displays a set of one or more unsecure network resources. When the computing session security level is high, the unsecure network resources tab 1250 may display a warning indicating that using any of the displayed unsecure network resources will cause the security level to decrease.

It should also be understood that the customer 105 does not have to select from one of the resources displayed in FIGS. 12A-12C. For example, the customer 105 may enter in a website address that is not displayed in the FIGS. 12A-12B.

Referring back to FIG. 3, flow moves from block 365 to block 370, where the secure terminal 115A receives a selection of a resource option from the customer 105 (the resource option must comply with the current security level). Depending on the current security level, the selected resource option may be a secure resource or an unsecure resource. Flow then moves to block 375, where the secure terminal 115 is configured according to the session requirements for the selected resource option (if any).

Figure 9:
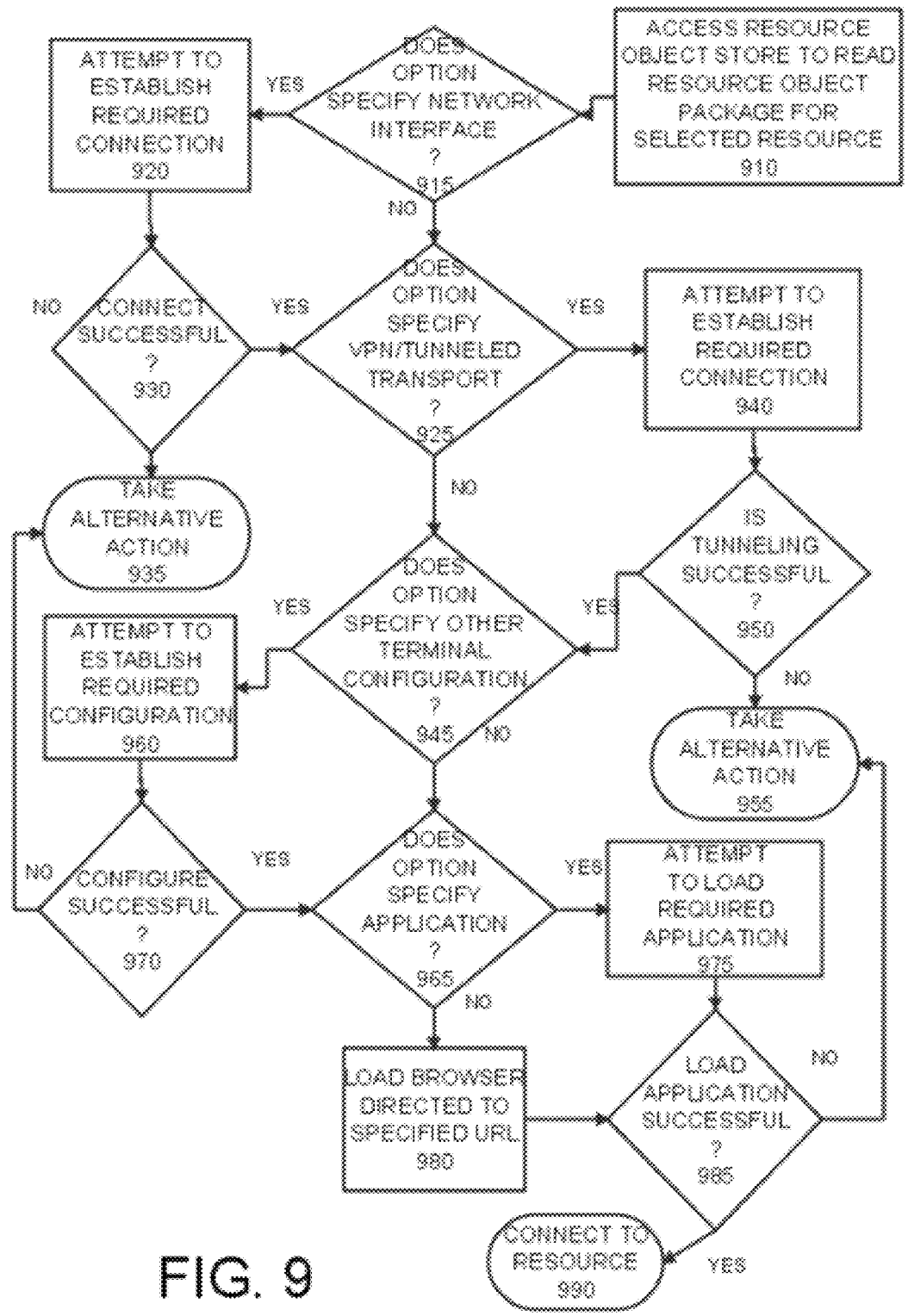
FIG. 9 is a flow diagram illustrating exemplary operations for dynamically configuring the secure terminal based on resource requirements according to one embodiment.

As previously described, some resources may require certain secure terminal settings or other requirements to be configured as a prerequisite for connecting. For example, a corporate email resource may require a VPN connection to the corporate email server. FIG. 9 is a flow diagram illustrating exemplary operations for dynamically configuring the secure terminal based on resource requirements according to one embodiment. The operations of FIG. 9 will be described with reference to the computing session interface control module 246; however it should be understood that the operations of FIG. 9 can be performed by different module(s) and/or logic of the secure terminal 115A.

The operations of FIG. 9 begin at block 910, where the computing session interface control module 246 accesses the resource object store 236 to read the resource object package corresponding to the selected resource. Flow then moves to block 915, where the interface control module 246 determines whether the resource specifies a particular network interface. For example, some resources may require a cellular data connection from a specified cellular provider while other resources may require a Wi-Fi connection through a specified network provider, etc. If a particular network interface is selected, then flow moves to block 920 where the interface control module 246 attempts to establish and connect to the required network connection; otherwise flow moves to block 925. Flow moves from block 920 to block 930 where it is determined whether the network interface connection was successful. If it was successful, then flow moves to block 925; otherwise flow moves to block 935 and alternative action is taken (e.g., the customer is notified that the selected resource cannot be accessed).

At block 925, the interface control module 246 determines whether the resource requires VPN or tunneled transport. If no, then flow moves to block 945. If yes, then flow moves to block 940 where the secure terminal 115A attempts to establish the VPN connection or tunneled transport and flow moves to block 950. At block 950, it is determined whether the VPN connection or other tunneling was successful. If it was successful, then flow moves to block 945, otherwise flow moves to block 955 where alternative action is taken (e.g., the customer is notified that the selected resource cannot be accessed because a VPN connection or tunnel could not be established).

At block 945, the interface control module 246 determines whether the resource specifies other terminal configurations or settings (e.g., firewall settings, proxy settings, age requirement, etc.). For example, as previously described, the resource owner may establish a website (or other content) as requiring to be over a certain age, below a certain age, within a certain age range, etc. If no, then flow moves to block 965. If yes, then flow moves to block 960 where the interface control module 246 attempts to configure the other settings and flow moves to block 970. For example, if the resource identifies an age requirement, the session interface control module 246 accesses the customer specific authorization data storage 232 to determine if it includes a date of birth. In one embodiment, if a date of birth is not stored on the data storage 232, the customer 105 may only have access to general content. If the customer's date of birth is on the data storage 232, the session interface control module 246 determines whether the customer meets the age requirement. At block 970, it is determined whether the configuration was successful. If it was successful, then flow moves to block 965, otherwise flow moves to block 935 where alternative action is taken (e.g., the customer is notified that the selected resource cannot be accessed).

At block 965, the interface control module 246 determines whether the resource is for a local application (e.g., a media player, a word processing program, an email client, etc.). If yes, then flow moves to block 970 where an attempt is made to load the application and flow moves to block 975. If the resource is not a local application (e.g., it is a website), then flow moves to block 980 where the secure terminal customized web browser 244 is loaded and directed to the specified URL of the resource and flow moves to block 975. At block 975, it is determined whether the application (either the local application or the web browser 244) was loaded successfully. If the application was not loaded successfully, then flow moves to block 955 where alternative action is taken; otherwise flow moves to block 990 where the secure terminal 115A connects to the resource source.

Referring back to FIG. 3, after the secure terminal 115A is configured according to the session requirements for the selected resource option in block 375, flow then moves to block 380 where the selected resource option is executed. The selected resource option may be a network resource accessed by the secure terminal customized web browser 244.

Figure 6:
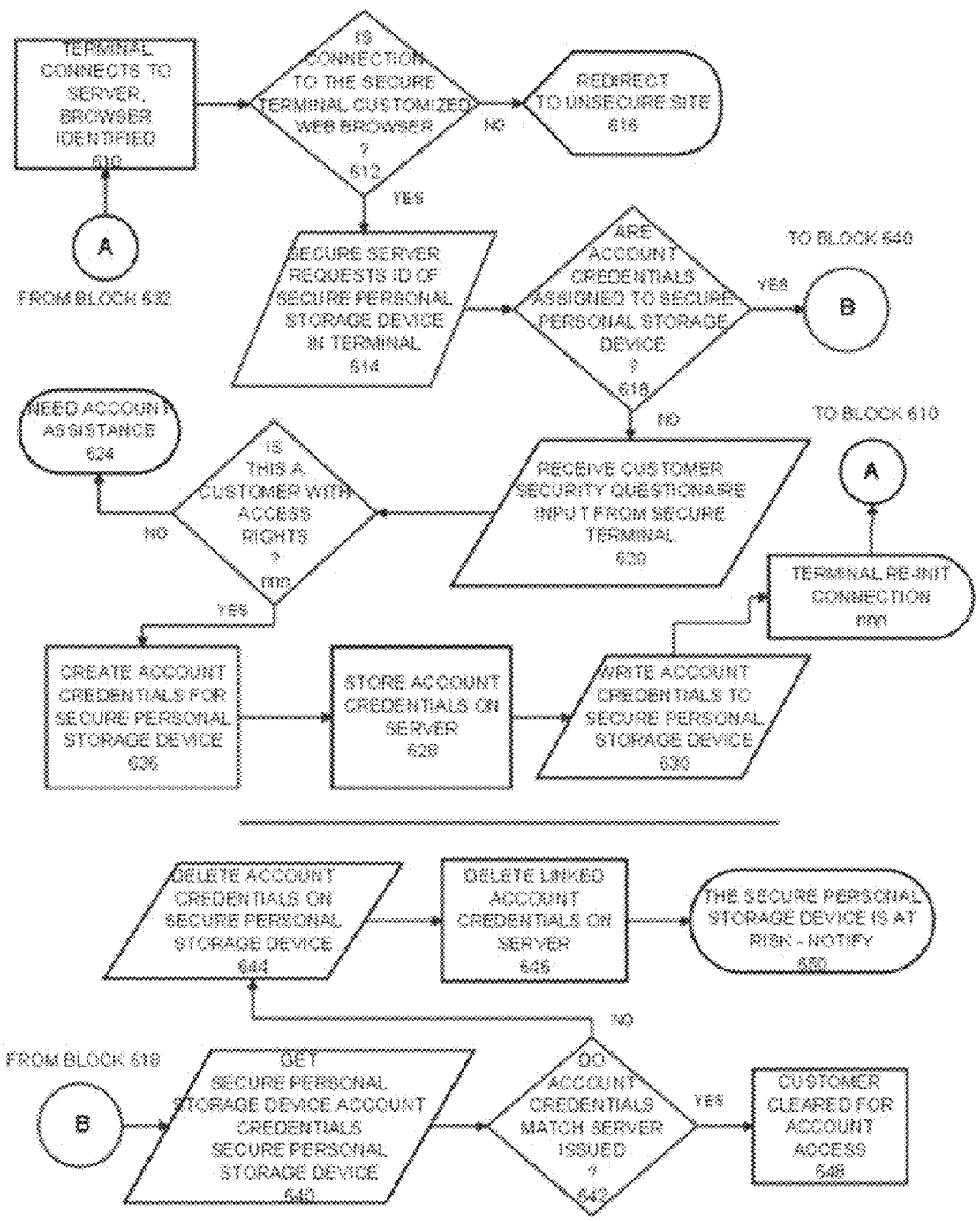
FIG. 6 is a flow diagram illustrating exemplary operations for accessing network content using the personal portable secured network access system of FIG. 1 according to one embodiment.

As previously described, some content and/or service providers may provide secure content and/or services through use of the secure system described herein. FIG. 6 is a flow diagram illustrating exemplary operations for accessing network content using the personal portable secured network access system of FIG. 1 according to one embodiment. The operations of FIG. 6 will be described with reference to the exemplary embodiment of FIG. 2. However, it should be understood that the operations of FIG. 6 can be performed by embodiments of the invention other than those discussed with reference to FIG. 2, and the embodiments discussed with reference to FIG. 2 can perform operations different than those discussed with reference to FIG. 6.

The operations of FIG. 6 begin at block 610, where a computing device is connecting to a content server (e.g., the content server 120A). The content server 120A then determines the type of browser being used for the connection. Flow then moves to block 612, where the content server 120A determines whether the connection is from a customized secure terminal web browser (and thus from a secure terminal such as the secure terminal 115A). If it is, then flow moves to block 614, otherwise flow moves to block 616 where the computing device, which is not a secure terminal, is redirected to an unsecure portion of the content server 120A.

At block 614, the content server 120A requests the secure personal storage device identifier 280 from the secure personal storage device 110. The secure terminal 115A accesses the identifier and transmits it to the content server 120A. Flow then moves to block 618, where the content server 120 determines whether account credentials (e.g., username and password or other authentication key(s)) are assigned for the secure personal storage device identifier 280. For example, the customer authentication module 264 accesses the customer account credentials 268 to determine whether account credentials exist for the secure personal storage device identifier 280. In one embodiment, the account credentials will not exist until after the first time the customer 105 accesses the content server 120A using a secure terminal such as the secure terminal 115A. If there are account credentials for the identifier 280, then flow moves to block 640; otherwise flow moves to block 620.

At block 620, the content server 120 displays and receives answers from a customer security questionnaire to verify the identity of the customer 105. For example, the security questionnaire may involve a series of personal questions previously known to the content server 120 due to their previous business relationship (e.g., grandmother's maiden name, first pet, etc.). The operations in block 620 may also involve personal account assistance (e.g., interaction with a customer service representative). Once satisfied of the customer's identity, then flow moves to block 622 where it is determined whether the customer has access rights to the selected resource (e.g., whether the customer 105 has an account with the content and/or service provider). For example, the customer authentication module 264 accesses the customer accounts 272 to determine whether the customer 105 as access rights. If the customer does not have access rights, then flow moves to block 624 where account assistance is performed. For example, the customer is provided the option of registering for an account, etc. If the customer has access rights, then flow moves to block 626.

At block 626, the content server 120A creates account credentials for the secure personal storage device identifier 280. In one embodiment, the customer 105 will never know the content of the account credentials. The account credentials can be a username and password or other unique authentication key(s). Flow moves from block 626 to block 628, where the created account credentials are stored on the content server 120A (e.g., in the customer account credentials 268). As part of storing the created account credentials, they are associated with the secure personal storage device identifier 280. Flow moves from block 628 to block 630.

At block 630, the created account credentials are written to the secure personal storage device 110 (e.g., in the resource object store 236). Thus the next time that the customer 105 uses the secure personal storage device 110 through a secure terminal to access the content server 120A, content server 120A will retrieve the generated account credentials from the secure personal storage device 110 and automatically take the customer 105 to his/her account (typically without further user interaction). Thus in place of a username and password and/or a PIN, the customer can simply use the secure personal storage device 110 when accessing network content requiring access authentication (assuming that network content is secure and part of the personal portable secured network access system). Thus the customer 105 does not need to worry about forgetting usernames, passwords, etc. when using the secure personal storage device 110 in the personal portable secured network access system. Flow moves from block 630 to block 632, where the secure terminal 115A re-initializes the network connection and flow moves back to block 610.

Referring back to block 640 (the content server 120A has identified account credentials for the secure personal storage device identifier 280), the content server 120A requests and receives from the secure terminal 115A the account credentials from the secure personal storage device 110 (e.g., stored in the resource object store 236). Flow then moves to block 642, where the content server 120A (e.g., the authentication module 264) determines whether the account credentials from the secure personal storage device 110 match the account credentials of the server 120A (e.g., stored in the customer account credentials 268). If the credentials match, then flow moves to block 648 where the customer 105 is authenticated and cleared for account access. The content server 120A may automatically take the customer 105 to his/her account.

If the credentials do not match, then flow moves to block 644 where the server 120A instructs the secure terminal 115A to delete those account credentials from the resource object store 236 (they are then deleted). Flow then moves to block 646 where the server 120A deletes the account credentials and its association with the secure personal storage device identifier 280 from the customer account credential store 268. Flow then moves to block 650 where the customer 105 is notified that the account credentials are not valid and that there may be a problem with the secure personal storage device 110 or their account at the content server 120A may have been compromised.

Referring back to FIG. 3, sometime after the selected resource option begins executing in block 380, flow moves to block 385 where the security level is adjusted to the current resource level (if needed). For example, if the security level was at its highest level (allowing unsecure and secure resource access) and the executed resource was at a lower level, the security level will be adjusted to be at that lower level. In some embodiments the security level cannot be increased until the computing session is restarted. Flow moves from block 385 to block 390, where the options requiring a higher security level are prevented from being accessed. For example, those options may be grayed out and not selectable or not displayed in the exemplary user interface of FIGS. 12A-12C. Flow moves from block 390 back to block 365.

In one embodiment, after a certain amount of time elapsing without the customer 105 interacting with the secure terminal 115A, the secure terminal 115A may be locked or put into a hibernation mode where the authentication for the customer 105 is expired. Thus, in order to use the secure terminal 115A again, the customer 105 must reauthorize to the secure terminal 115A. Thus, if an authentication timeout occurs or the secure terminal 115 goes into hibernation mode, as indicated by block 395 in FIG. 3, control flows to block 330 if the customer 105 wants to authenticate again to the secure terminal 115.

The customer 105 may remove the secure personal storage device 110 from the secure terminal 115A at any time during operation. As previously described, this will cause the secure computing session to terminate (if one exists) and the temporary memory of the secure terminal 115A to be wiped such that no trace of data related to the customer 105 remains on the secure terminal 115A. In certain situations, the customer 105 may also choose to restart the secure computing session without removing the secure personal storage device 110 (e.g., the current security level prevents access to a desired network resource, an authentication timeout as occurred, etc.).

Figure 8:
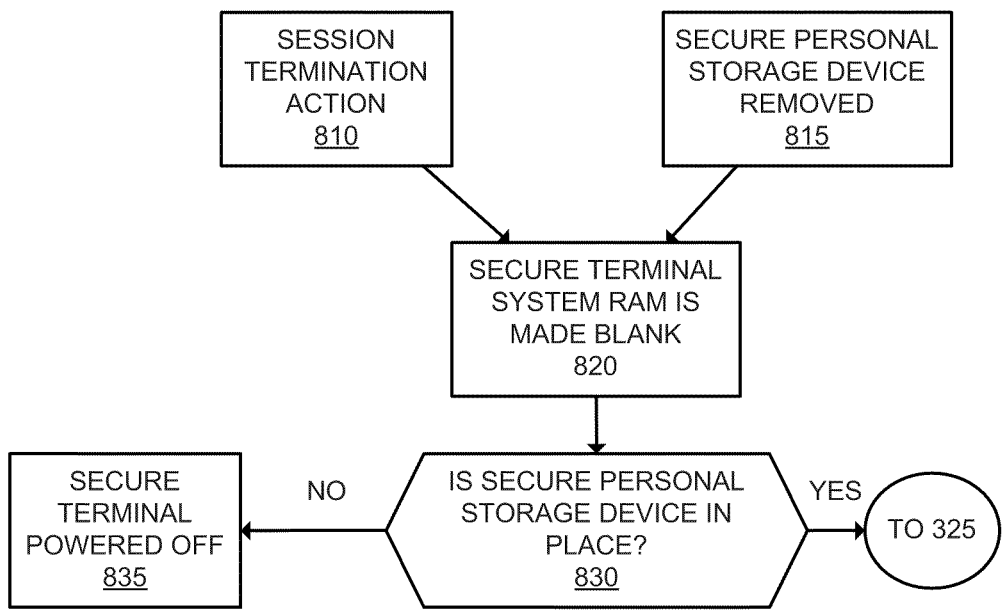
FIG. 8 is a flow diagram illustrating exemplary options for terminating secure computing sessions according to one embodiment of the invention.

FIG. 8 is a flow diagram illustrating exemplary options for terminating secure computing sessions according to one embodiment of the invention. The operations of FIG. 8 will be described with reference to the exemplary embodiment of FIG. 2. However, it should be understood that the operations of FIG. 8 can be performed by embodiments of the invention other than those discussed with reference to FIG. 2, and the embodiments discussed with reference to FIG. 2 can perform operations different than those discussed with reference to FIG. 8.

At block 810, a session termination action event is detected on the secure terminal 115A. This may be a customer initiated session termination action event (e.g., the customer 105 may want to restart the session) or a secure terminal 115A initiated session termination event (e.g., an authentication timeout has occurred). Flow moves from block 810 to block 820. In block 815, the customer 105A (or other user) has removed the secure personal storage device 110 from the secure terminal 115A. Flow also moves from block 815 to block 820.

At block 820, the secure terminal system memory (e.g., RAM) is made blank by electronics such that no trace of data related to the customer 105A remains or can be retrieved. For example, the memory blank electronics 278 permanently erases the secure terminal system memory by setting all values to zero. Flow moves from block 820 to block 830, where it is determined whether the secure personal storage device 110 is within the secure terminal 115A. If it is, then flow moves back to block 325 of FIG. 3 where the authentication module 242 is launched allowing the customer 105 to re-authenticate to the secure terminal 115A. If the secure personal storage device 110 is not in the secure terminal 115A, then flow moves to block 835 where the terminal is powered off.

Data may be generated during the computing session. For example, the customer 105 may create a document, save a bookmark, etc. As previously described, this data may be saved onto the secure personal storage device 110 (e.g., in the user data store 238) if the current security levels allow. For example, if the customer 105 browsed to an unsecure network resource (e.g., an untrusted website), there may be some amount of risk in allowing the customer 105 to store data onto his/her secure personal storage device 110 (e.g., if the data included viruses, malware, or other malicious data). As such, in one embodiment the secure terminal 115A prevents writing to the personal storage device 110 unless the current security level allows for writing. In some embodiments, during any time during the computing session, the customer 105 may attempt to save data to the secure personal storage device 110.

Figure 7:
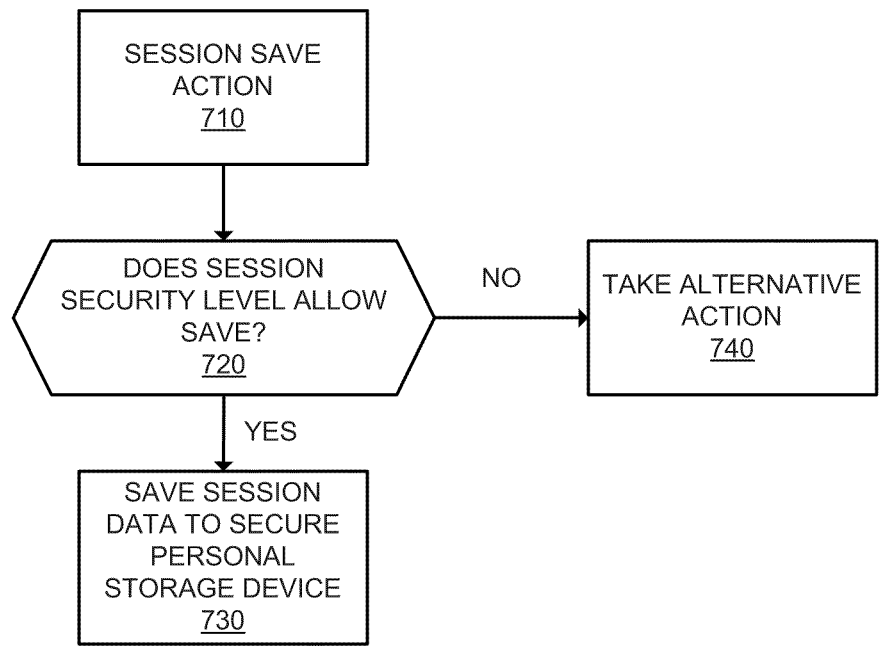
FIG. 7 is a flow diagram illustrating exemplary operations for processing a data save request according to one embodiment of the invention.

FIG. 7 is a flow diagram illustrating exemplary operations for processing a data save request according to one embodiment of the invention. The operations of FIG. 7 will be described with reference to the exemplary embodiment of FIG. 2. However, it should be understood that the operations of FIG. 7 can be performed by embodiments of the invention other than those discussed with reference to FIG. 2, and the embodiments discussed with reference to FIG. 2 can perform operations different than those discussed with reference to FIG. 7.

At block 710, a session save action event is detected on the secure terminal 115A. In one embodiment only a customer may initiate a save event while in other embodiments the secure terminal 115A may initiate a save event (e.g., when writing the account credentials to the secure personal storage device 110). Flow moves from block 710 to block 720, where it is determined whether the current security level allows saving to the secure personal storage device 110. As described above, some security levels may not allow writing to the secure personal storage device 110. If saving is allowed, then flow moves to block 730 where the session data is saved to the secure personal storage device 110 (e.g., in the user data store 238). If saving is not allowed, then flow moves to block 740 where alternative action is taken (e.g., the customer 105 is notified that the data cannot be saved because of the current security level).

Figure 10:
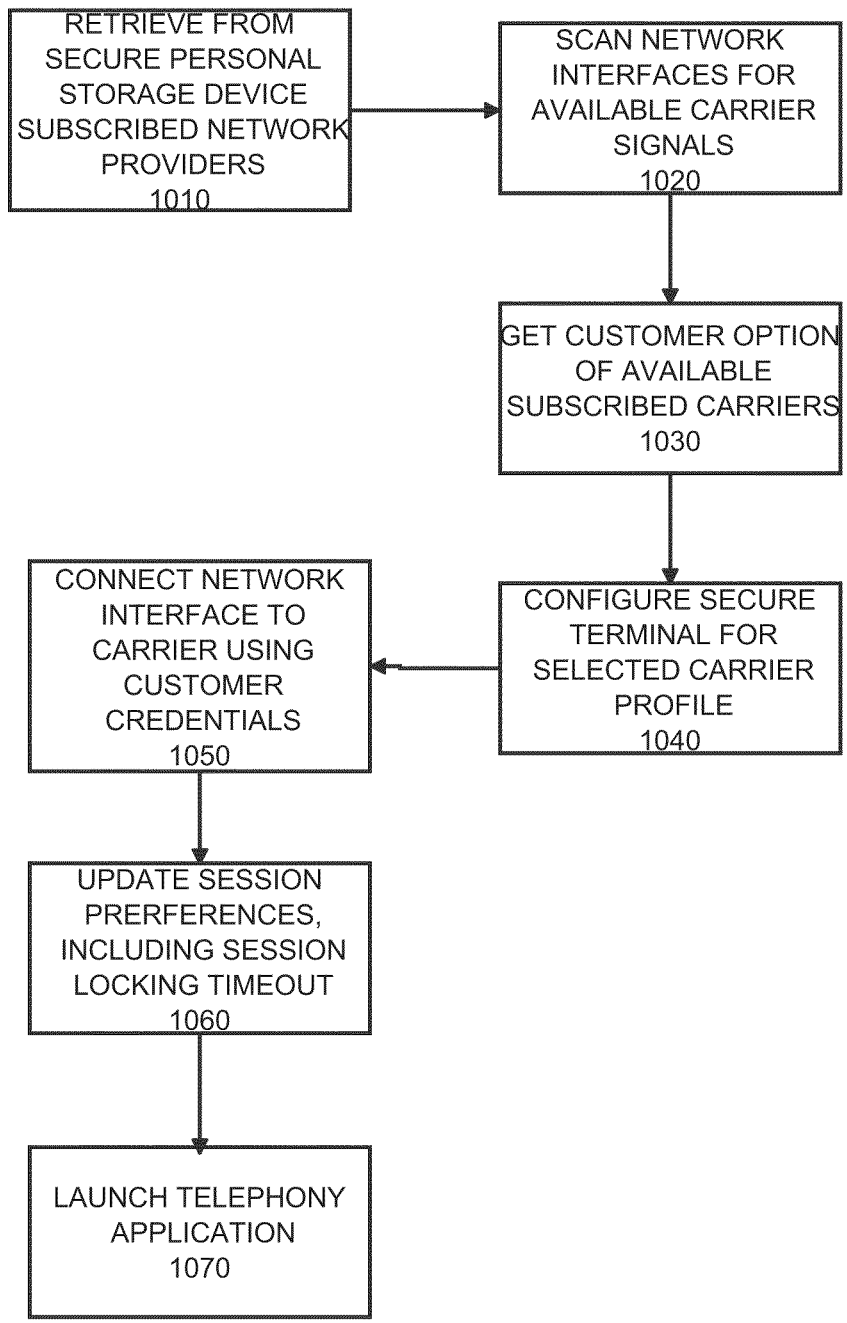
FIG. 10 is a flow diagram illustrating exemplary operations for a customer 105 to select between multiple network interfaces for multiple network service providers.

FIG. 10 is a flow diagram illustrating exemplary operations for a customer 105 to select between multiple network interfaces for multiple network service providers. For example, the customer 105 may have accounts for multiple wireless service providers. This is particularly common for travelers. The operations begin at block 1010, where the secure terminal 115A retrieves from the secure personal storage device 110 the subscribed network providers of the customer 105. For example, the list of available network providers may be stored in the resource object store 236. Flow then moves to block 1020, where the secure terminal 115A scans its network interfaces for available carrier signals. The secure terminal 115A also displays the list of network interfaces to the customer 105. Flow then moves to block 1030, where the secure terminal 115A receives a selection from the customer 105 for one of the available subscribed carriers. Next, flow moves to block 1040 where the secure terminal 115A modifies its configuration for the selected carrier profile. Flow moves from block 1040 to block 1050.

At block 1050, the secure terminal 115A connects to the selected network interface to the carrier using the customer credentials for that carrier. The customer credentials are stored in the resource object store 236. Flow then moves to block 1060, where the secure terminal 115A updates the computing session preferences including a session locking timeout. For example, different network providers (and different network interfaces) may have different session lockout timers and other computing session preferences as previously described with reference to FIG. 9. After the computing session preferences are updated, flow moves to block 1070 where a telephony application (or other application using the carrier's network) is launched.

Thus embodiments of the invention allow for the customer to dynamically switch between wireless service providers without requiring a separate hardware device such as a different SIM (Subscriber Identity Module) card for each wireless service provider.

Figure 11:
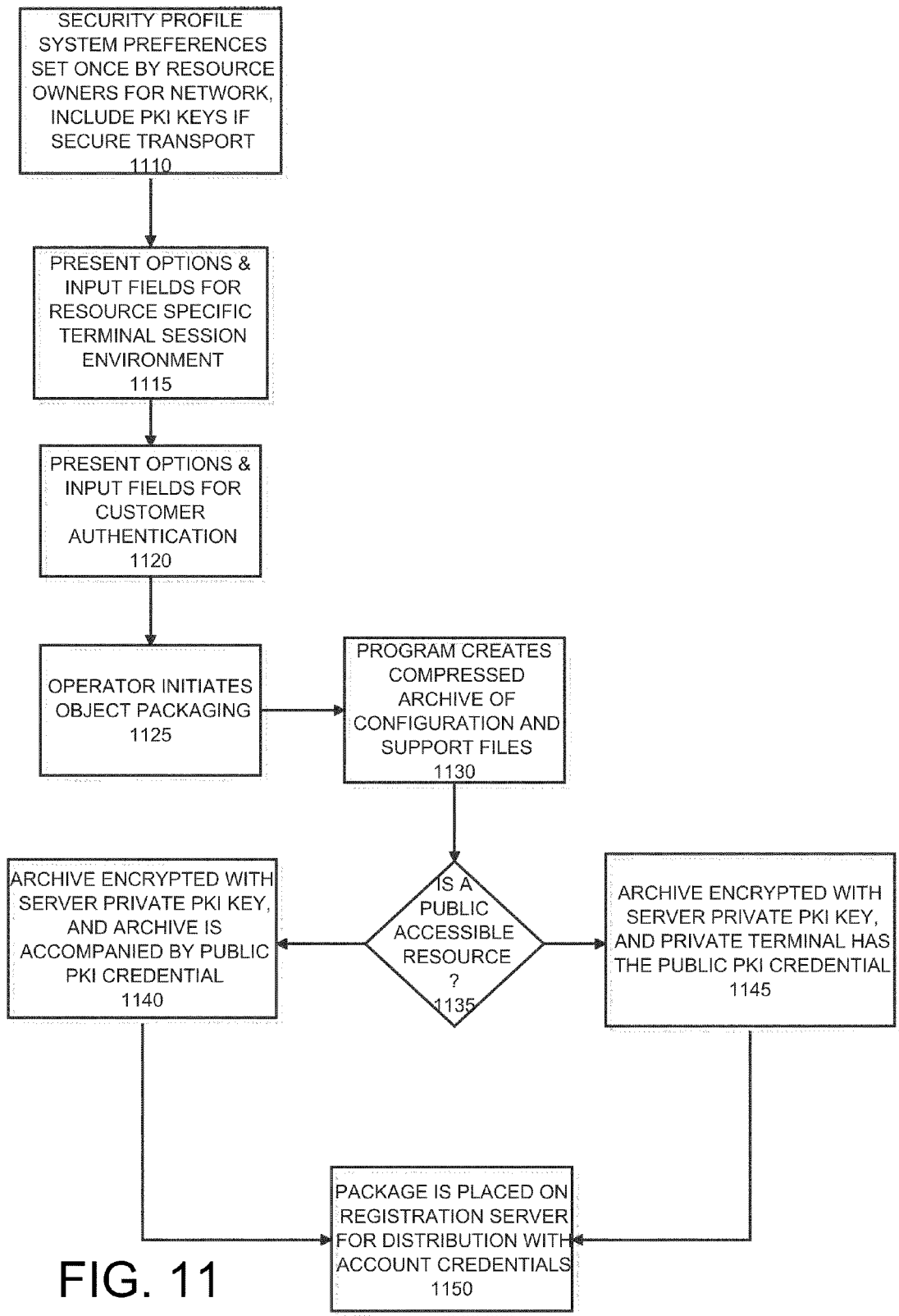
FIG. 11 is a flow diagram illustrating exemplary operations for a resource owner to provide resource requirements according to one embodiment of the invention.

FIG. 11 is a flow diagram illustrating exemplary operations for a resource owner to provide resource requirements according to one embodiment of the invention. The operations of FIG. 11 will be described with reference to the exemplary embodiment of FIG. 2. However, it should be understood that the operations of FIG. 11 can be performed by embodiments of the invention other than those discussed with reference to FIG. 2, and the embodiments discussed with reference to FIG. 2 can perform operations different than those discussed with reference to FIG. 11.

The operations of FIG. 11 begin at block 1110, where a resource owner sets security profile system preferences for their network, including PKI keys if secure transport is needed. In one embodiment, the security profile system preferences includes approved local and VPN client applications of the secure terminal 115A that can access the network of the resource owner. These may be represented in a hierarchical folder structure. Flow moves from block 1110 to block 1115, where the resource owner is presented with a number of options and input fields for resource specific secure terminal session configuration. For example, the options and input fields may include one or more of VPN settings, proxy settings, firewall settings, etc. Flow moves from block 1115 to block 1120. At block 1120, the resource owner is presented with a number of options and input fields for customer session requirements (e.g., session timers, revalidation timers, age verification, etc).

After selecting the terminal configuration requirements and customer authentication requirements, flow moves to block 1125 where the resource owner initiates object packaging for transport to the secure personal storage device 110. Flow moves from block 1125 to block 1130 where a compressed archive of configuration and support files are created. It should be understood that in some embodiments, compression is optional. Flow moves from block 1130 to block 1135, where a determination is made whether the resource is a publicly accessible resource. If it is not a publicly accessible resource, then flow moves to block 1140 where the archive is encrypted with the private PKI key of the server, and is accompanied by its public PKI credential. If it is a publicly accessible resource, then flow moves to block 1145 where the archive is encrypted with the private PKI key of the server (the secure terminal 115A has the public PKI credential). Flow moves from blocks 1140 and 1145 to block 1150, where the package is placed on a registration server for distribution to the secure personal storage device 110 along with the account credentials as previously described.

Figure 13:
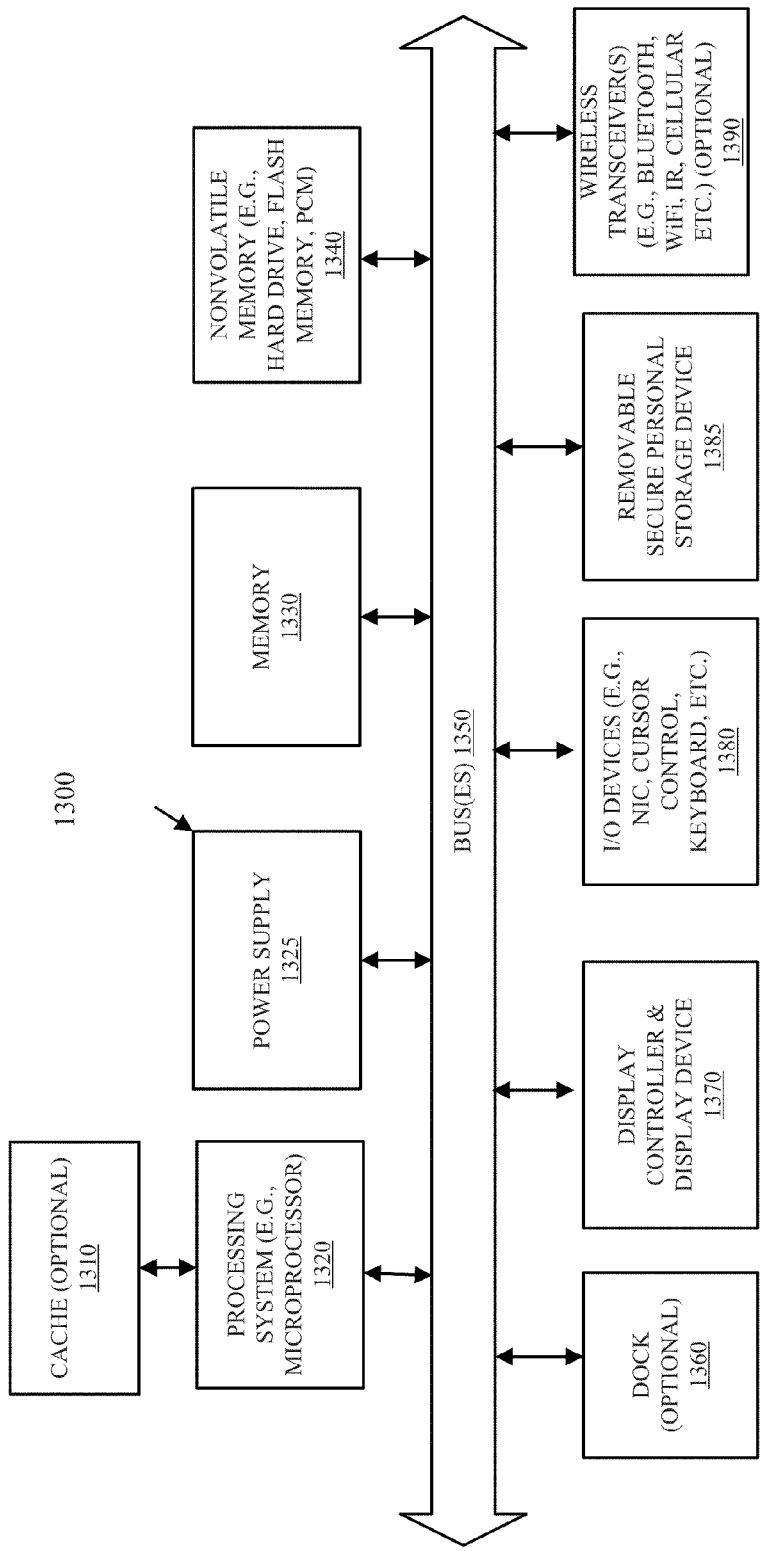
FIG. 13 is a block diagram illustrating an exemplary computer system which may be used in some embodiments of the invention.

FIG. 13 is a block diagram illustrating an exemplary computer system which may be used in some embodiments of the invention. For example, the exemplary architecture of the computer system 1300 may be included in the secure terminal 115A. It should be understood that while FIG. 13 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 13, the computer system 1300, which is a form of a data processing system, includes the bus(es) 1350 which is coupled with the processing system 1320, power supply 1325, memory 1330, and the nonvolatile memory 1340 (e.g., a hard drive, flash memory, Phase-Change Memory (PCM), etc.). The bus(es) 1050 may be connected to each other through various bridges, controllers, and/or adapters as is well known in the art. The processing system 1320 may retrieve instruction(s) from the memory 1330 and/or the nonvolatile memory 1340, and execute the instructions to perform operations as described above. The bus 1350 interconnects the above components together and also interconnects those components to the optional dock 1360, the display controller & display device 1370, Input/Output devices 1080 (e.g., NIC (Network Interface Card), a cursor control (e.g., mouse, touchscreen, touchpad, etc.), a keyboard, etc.), the removable secure personal storage device 1385 (e.g., the secure personal storage device 110), and the optional wireless transceiver(s) 1090 (e.g., Bluetooth, WiFi, Infrared, etc.).

The optional dock 1360 can be used as a desktop connection to peripherals. This allows the secure terminal 115, when placed in the dock 1360, to replace most of not all functions of a personal computer tower. The secure terminal 115, when used with the dock 1360, can also send a movie to a large screen high definition television or other device.

The techniques shown in the figures can be implemented using code and data stored and executed on one or more electronic devices (e.g., a secure terminal, a content server, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

While embodiments of the invention have been described in relation to the secure terminal and secure personal storage device authenticating a user for network access, embodiments are not so limited. The use of the secure terminal authenticating a customer using the secure personal storage device can provide authentication and/or the user with secure access to: use a device or machine, access hardware, access a website, access a network, open a door or otherwise enter a room, use an ATM, engage in a transaction, access to and use of secure digital media content (movies, music, etc.).

In some embodiments, the secure personal storage device includes resource objects that allow the secure personal storage device to act as a voter registration card, drivers license, ticket (e.g., to a sporting event or show), transaction card (e.g., banking), etc.

To illustrate an example of the use of the system described herein, a movie studio may have a secure site on the interface illustrated in FIGS. 12. The studio can list all the movie titles and prices of the movies they are selling. The studios may categorize their films, i.e. new release, adventure, comedy, etc. The studios can have trailers and reviews on their site. The secure terminal user (e.g., the customer 105) can register for an entertainment account, and the user name and password will be stored on their secure personal storage device. This account will allow the user to save a list (movie library) of all movies purchased. The user can then download any movie from their movie library onto their secure personal storage device and watch each movie as many times as they wish. The movie can be viewed on the directly on the secure terminal or on another display through the dock 1360.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a secure terminal for securely connecting one or more users to secure content, the method comprising:
   receiving, from a first secure personal storage device of a first user, biometric authentication information that is stored on the first secure personal storage device;
   receiving, from the first user, biometric input;
   biometrically authenticating the first user to the secure terminal using the biometric authentication information received from the first secure personal storage device and the biometric input received from the first user;
   after successfully biometrically authenticating the first user to the secure terminal, receiving a first request from the first user to access a first secure network resource at a first content server;
   participating in an authentication process for authenticating the secure terminal to access the first content server;
   after a successful authentication of the secure terminal, automatically transmitting account credentials of the first user for the first content server that are stored on the first secure personal storage device for authenticating the first user to the first content server;
   accessing the first requested network resource after a successful authentication of the account credentials of the first user at the first content server;
   after successfully biometrically authenticating the first user to the secure terminal, receiving a second request from the first user to access a second secure network resource at a second content server;
   participating in an authentication process for authenticating the secure terminal to access the second content server;
   after a successful authentication of the secure terminal, automatically transmitting account credentials of the first user for the second content server that are stored on the first secure personal storage device for authenticating the first user to the second content server; and
   accessing the requested second network resource after a successful authentication of the account credentials of the first user at the second content server.

2. The method of claim 1, further comprising:
   wherein prior to the step of receiving the biometric authentication information from the first secure personal storage device, determining whether the first secure personal storage device is formatted for use in the secure terminal; and
   upon a determination that the first secure personal storage device is not formatted for use in the secure terminal, formatting the first secure personal storage device for use in the secure terminal.

3. The method of claim 1, further comprising:
   wherein prior to the step of receiving the biometric authentication information from the first secure personal storage device, performing the following:
   receiving the first secure personal storage device;
      responsive to determining that biometric training has not been completed, training the first user for one or more biometric authentication mechanisms including presenting one or more biometric challenges to the first user and receiving one or more biometric responses from the first user in response to the presented one or more biometric challenges.

4. The method of claim 1, further comprising:
   wherein prior to the step of receiving the biometric authentication information from the first secure personal storage device, receiving the first secure personal storage device;
   responsive to receiving the first secure personal storage device, powering the secure terminal and booting an operating system of the secure terminal.

5. The method of claim 4, further comprising:
   responsive to the first secure personal storage device being disconnected from the secure terminal, removing any temporary data associated with the first user from memory of the secure terminal.

6. The method of claim 1, further comprising:
   wherein the first secure personal storage device further includes a secure personal storage device identifier that is a unique identifier to the first secure personal storage device and is unknown to the first user; and
   responsive to receiving a request from the first content server for the secure personal storage device identifier, transmitting the secure personal storage device identifier to the first content server for use when authenticating the account credentials of the first user.

7. The method of claim 1, wherein the account credentials of the first user for the first content server are issued by the first content server to the first secure personal storage device and are of a value that is unknown to the user.

8. The method of claim 1, wherein the secure terminal does not store and retain data of the first user.

9. The method of claim 1, wherein the first secure personal storage device further includes data files of the user.

10. The method of claim 1, wherein the biometric authentication information and the account credentials for the first content server are stored in an encrypted format in the first secure personal storage device and are decrypted by the secure terminal.

11. The method of claim 1, wherein the first user is allowed access to the requested first network resource without the first user having to input one or more of a username, a password, and a personal identification number.

12. The method of claim 1, further comprising:
   receiving a request from the first user to access a third secure network resource at a third content server, wherein the first secure personal storage device does not include account credentials for the third content server at the time of the request;
   participating in an authentication process for authenticating the secure terminal to the third content server;
   displaying a set of one or more challenges created by the third content server to verify an identity of the first user;

receiving input from the first user to answer the set of challenges and transmitting answers to the set of challenges to the third content server;
receiving, from the third content server, account credentials assigned to the first user for the third content server;
writing the account credentials assigned to the first user for the third content server to the first secure personal storage device; and
accessing the requested third secure network resource at the third content server.

13. The method of claim 1, further comprising:
determining that a predefined amount of time has elapsed since the first user interacted with the secure terminal, and responsive to that determination, locking the secure terminal such that the first user is required to again be biometrically authenticated to the secure terminal to unlock and use the secure terminal.

14. The method of claim 1, further comprising performing the following after the first secure personal storage device of the first user has been disconnected from the secure terminal:
receiving, from a second secure personal storage device of a second user, biometric authentication information that is stored on the second secure personal storage device;
receiving, from the second user, biometric input;
biometrically authenticating the second user to the secure terminal using the biometric authentication information received from the second secure personal storage device and the biometric input received from the second user;
after successfully biometrically authenticating the second user to the secure terminal, receiving a request from the second user to access a secure network resource at the first content server;
participating in an authentication process for authenticating the secure terminal to access the first content server;
after a successful authentication of the secure terminal, automatically transmitting account credentials of the second user for the first content server that are stored on the second secure personal storage device to the first content server for authenticating the user to the first content server; and
accessing the requested network resource after a successful authentication of the account credentials of the second user.

15. The method of claim 1, wherein accessing the requested network resource is performed through a network application on the secure terminal that is launched and accessible to the first user only after the first user is successfully biometrically authenticated to the secure terminal.

16. A secure terminal, comprising:
an authentication module that is configured to biometrically authenticate a user to the secure terminal based on a comparison of biometric authentication information received from a secure personal storage device of the user that is coupled with the secure terminal and biometric input that is to be received from the user;
a network application that is launched and accessible to the user only after the user is successfully biometrically authenticated to the secure terminal, the network application configured to:
receive requests from the user to access secure content or services at a plurality of content serve
for each of the plurality of content servers, automatically transmit account credentials of the user for that content server that are stored on the secure personal storage device for authenticating the user to that content server after the secure terminal is authenticated for access to content at that content server, and
access the secure content or services at the plurality of content servers after a successful authentication of the account credentials of the user for the plurality of content servers respectively; and
a key store that is configured to store one or more encryption keys that are used to authenticate the secure terminal for access to content at the plurality of content servers.

17. The secure terminal of claim 16, further comprising:
a biometric training application configured to train one or more biometric authentication mechanisms for the user including presenting one or more biometric challenges to the user and receiving one or more biometric responses from the user in response to the presented one or more biometric challenges, wherein the biometric training application is to be initiated upon a determination that biometric training has not been completed for the user.

18. The secure terminal of claim 16, further comprising:
memory blank electronics configured to erase temporary memory of the secure terminal.

19. The secure terminal of claim 18, wherein the memory blank electronics is configured to erase the temporary memory of the secure terminal upon the secure personal storage device being disconnected from the secure terminal.

20. The secure terminal of claim 16, further comprising:
power circuitry that is configured to power the secure terminal only upon the secure personal storage device being inserted into the secure terminal.

21. The secure terminal of claim 16, wherein the secure terminal is configured to receive a secure personal storage device identifier from the secure personal storage device and transmit the secure personal storage device identifier to one of the plurality of content servers.

22. The secure terminal of claim 16, wherein the account credentials are of a value that is unknown to the user.

23. The secure terminal of claim 16, wherein the network application is configured to automatically transmit the account credentials without the user having to input one or more of a username, a password, and a personal identification number.

24. The secure terminal of claim 16, wherein the secure terminal is further configured to lock such that the user is required again to be biometrically authenticated to the secure terminal to unlock and use the secure terminal after a predefined amount of time has elapsed since the user interacted with the secure terminal.

25. A non-transitory machine-readable storage medium that provides instructions that, when executed by a processor of a secure terminal, cause said processor to perform operations for securely connecting users to secure content, comprising
receiving, from a first secure personal storage device of a first user, biometric authentication information that is stored on the first secure personal storage device;
receiving, from the first user, biometric input;
biometrically authenticating the first user to the secure terminal using the biometric authentication information received from the first secure personal storage device and the biometric input received from the first user;
after successfully biometrically authenticating the first user to the secure terminal, receiving a first request from the first user to access a first secure network resource at a first content server;
participating in an authentication process for authenticating the secure terminal to access the first content server;
after a successful authentication of the secure terminal, automatically transmitting account credentials of the first user for the first content server that are stored on the first secure personal storage device for authenticating the first user to the first content server;
accessing the first requested network resource after a successful authentication of the account credentials of the first user at the first content server;
after successfully biometrically authenticating the first user to the secure terminal, receiving a second request from the first user to access a second secure network resource at a second content server;
participating in an authentication process for authenticating the secure terminal to access the second content server;
after a successful authentication of the secure terminal, automatically transmitting account credentials of the first user for the second content server that are stored on the first secure personal storage device for authenticating the first user to the second content server; and
accessing the requested second network resource after a successful authentication of the account credentials of the first user at the second content server.

26. The non-transitory machine-readable storage medium of claim 25, further comprising instructions that, when executed by the processor, cause said processor to perform the following operations:
wherein prior to the step of receiving the biometric authentication information from the first secure personal storage device, determining whether the first secure personal storage device is formatted for use in the secure terminal; and
upon a determination that the first secure personal storage device is not formatted for use in the secure terminal, formatting the first secure personal storage device for use in the secure terminal.

27. The non-transitory machine-readable storage medium of claim 25, further comprising instructions that, when executed by the processor, cause said processor to perform the following operations:
wherein prior to the step of receiving the biometric authentication information from the first secure personal storage device, performing the following:
receiving the first secure personal storage device;
responsive to determining that biometric training has not been completed, training the first user for one or more biometric authentication mechanisms including presenting one or more biometric challenges to the first user and receiving one or more biometric responses from the first user in response to the presented one or more biometric challenges.

28. The non-transitory machine-readable storage medium of claim 25, further comprising instructions that, when executed by the processor, cause said processor to perform the following operations:
wherein the first secure personal storage device further includes a secure personal storage device identifier that is a unique identifier to the first secure personal storage device and is unknown to the first user; and
responsive to receiving a request from the first content server for the secure personal storage device identifier, transmitting the secure personal storage device identifier to the first content server for use when authenticating the account credentials of the first user.

29. The non-transitory machine-readable storage medium of claim 25, wherein the account credentials of the first user for the first content server are issued by the first content server to the first secure personal storage device and are of a value that is unknown to the user.

30. The non-transitory machine-readable storage medium of claim 25, wherein the secure terminal does not store and retain data of the first user.

31. The non-transitory machine-readable storage medium of claim 25, wherein the first secure personal storage device further includes data files of the user.

32. The non-transitory machine-readable storage medium of claim 25, wherein the biometric authentication information and the account credentials for the first content server are stored in an encrypted format in the first secure personal storage device and are decrypted by the secure terminal.

33. The non-transitory machine-readable storage medium of claim 25, wherein the first user is allowed access to the requested first network resource without the first user having to input one or more of a username, a password, and a personal identification number.

34. The non-transitory machine-readable storage medium of claim 25, further comprising instructions that, when executed by the processor, cause said processor to perform the following operations:
receiving a request from the first user to access a third secure network resource at a third content server, wherein the first secure personal storage device does not include account credentials for the third content server at the time of the request;
participating in an authentication process for authenticating the secure terminal to the third content server;
displaying a set of one or more challenges created by the third content server to verify an identity of the first user;
receiving input from the first user to answer the set of challenges and transmitting answers to the set of challenges to the third content server;
receiving, from the third content server, account credentials assigned to the first user for the third content server;
writing the account credentials assigned to the first user for the third content server to the first secure personal storage device; and
accessing the requested third secure network resource at the third content server.

35. The non-transitory machine-readable storage medium of claim 25, further comprising instructions that, when executed by the processor, cause said processor to perform the following operation:
determining that a predefined amount of time has elapsed since the first user interacted with the secure terminal, and responsive to that determination, locking the secure terminal such that the first user is required to again be biometrically authenticated to the secure terminal to unlock and use the secure terminal.

36. The non-transitory machine-readable storage medium of claim 25, further comprising instructions that, when executed by the processor, cause said processor to perform the following operations after the first secure personal storage device of the first user has been disconnected from the secure terminal:
receiving, from a second secure personal storage device of a second user, biometric authentication information that is stored on the second secure personal storage device;
receiving, from the second user, biometric input;
biometrically authenticating the second user to the secure terminal using the biometric authentication information received from the second secure personal storage device and the biometric input received from the second user;
after successfully biometrically authenticating the second user to the secure terminal, receiving a request from the second user to access a secure network resource at the first content server;

participating in an authentication process for authenticating the secure terminal to access the first content server;

after a successful authentication of the secure terminal, automatically transmitting account credentials of the second user for the first content server that are stored on the second secure personal storage device to the first content server for authenticating the user to the first content server; and accessing the requested network resource after a successful authentication of the account credentials of the second user.

37. The non-transitory machine-readable storage medium of claim 25, wherein accessing the requested network resource is performed through a network application on the secure terminal that is launched and accessible to the first user only after the first user is successfully biometrically authenticated to the secure terminal.

* * * * *